(12) United States Patent
Flies

(10) Patent No.: US 9,922,001 B2
(45) Date of Patent: Mar. 20, 2018

(54) OFF-BOARD HOURS-OF-SERVICE ("HOS") PROCESSING

(71) Applicant: Omnitracs, LLC, San Diego, CA (US)

(72) Inventor: Thomas N. Flies, Poway, CA (US)

(73) Assignee: OMNITRACS, LLC, Dallas, TX (US)

( * ) Notice: Subject to any disclaimer, the term of this patent is extended or adjusted under 35 U.S.C. 154(b) by 487 days.

(21) Appl. No.: 13/789,304

(22) Filed: Mar. 7, 2013

(65) Prior Publication Data

US 2013/0304276 A1 Nov. 14, 2013

Related U.S. Application Data

(60) Provisional application No. 61/645,473, filed on May 10, 2012.

(51) Int. Cl.
*G06F 17/00* (2006.01)
*G06Q 10/00* (2012.01)
*G07C 5/00* (2006.01)
*G07C 5/08* (2006.01)
*G06Q 10/06* (2012.01)

(52) U.S. Cl.
CPC .............. *G06F 17/00* (2013.01); *G07C 5/008* (2013.01); *G07C 5/085* (2013.01); *G06Q 10/06* (2013.01); *G06Q 10/063* (2013.01); *G06Q 10/0639* (2013.01); *G06Q 10/06398* (2013.01)

(58) Field of Classification Search
None
See application file for complete search history.

(56) References Cited

U.S. PATENT DOCUMENTS

| 4,685,061 | A | 8/1987 | Whitaker |
| 5,541,858 | A | 7/1996 | Warner |
| 7,117,075 | B1* | 10/2006 | Larschan et al. ............ 701/29.6 |
| 7,340,332 | B2 | 3/2008 | Underdahl et al. |
| 8,032,277 | B2* | 10/2011 | Larschan et al. ............ 701/32.4 |
| 8,626,568 | B2* | 1/2014 | Warkentin ......... G06Q 10/0639 705/7.38 |
| 9,159,175 | B2* | 10/2015 | Larschan ............... G07C 5/008 |
| 2001/0010028 | A1 | 7/2001 | Thibault |
| 2003/0204362 | A1 | 10/2003 | Beresford et al. |
| 2004/0243285 | A1* | 12/2004 | Gounder ................ G07C 5/008 701/1 |

(Continued)

FOREIGN PATENT DOCUMENTS

| DE | 10109911 A1 | 8/2001 |
| DE | 102007062960 A1 | 6/2009 |
| WO | 2011043715 A1 | 4/2011 |

OTHER PUBLICATIONS

Partial International Search Report—PCT/US2013/039897—ISA/EPO—dated Aug. 1, 2013.

*Primary Examiner* — Thomas G Black
*Assistant Examiner* — Demetra R Smith-Stewart
(74) *Attorney, Agent, or Firm* — Arent Fox LLP

(57) ABSTRACT

Systems, methods, and devices for providing hour-of-service ("HOS") calculations via a web based host server instead of on an onboard mobile device. In the various embodiments, an onboard vehicle recording device and driver-carried mobile devices may operate independently. The onboard vehicle recording device and driver-carried mobile device(s) may exchange information independently with a host server rather than exchanging information together onboard the vehicle.

30 Claims, 20 Drawing Sheets

(56) References Cited

U.S. PATENT DOCUMENTS

| | | | |
|---|---|---|---|
| 2007/0038352 A1* | 2/2007 | Larschan et al. | 701/35 |
| 2010/0088163 A1* | 4/2010 | Davidson et al. | 705/11 |
| 2010/0100277 A1 | 4/2010 | Blythe et al. | |
| 2011/0112717 A1 | 5/2011 | Resner | |
| 2011/0281564 A1* | 11/2011 | Armitage | G07C 5/085 455/414.1 |
| 2012/0166346 A1* | 6/2012 | Machlab et al. | 705/317 |
| 2012/0194679 A1* | 8/2012 | Nehowig et al. | 348/148 |
| 2012/0253548 A1* | 10/2012 | Davidson | G06Q 10/08 701/1 |
| 2013/0226397 A1* | 8/2013 | Kuphal | G06Q 10/08 701/33.2 |
| 2014/0094995 A1* | 4/2014 | Scott | 701/1 |
| 2014/0122187 A1* | 5/2014 | Warkentin et al. | 705/7.38 |
| 2014/0180556 A1* | 6/2014 | Warkentin | G06Q 10/0639 701/99 |
| 2017/0067385 A1* | 3/2017 | Hunt | B60W 40/09 |

* cited by examiner

OFF-BOARD HOURS-OF-SERVICE ("HOS") PROCESSING

RELATED APPLICATIONS

This application claims the benefit of priority to U.S. Provisional Patent Application No. 61/645,473 entitled "Off-Board Hours-of-Service ("HOS") Processing" filed May 10, 2012, the entire contents of which are hereby incorporated by reference.

BACKGROUND

Drivers of heavy-duty trucks are required to record their hours-of-service ("HOS") record of duty status ("RODS"). Drivers can use automatic onboard recorder systems hard mounted in their heavy-duty trucks to automate this process using a combination of a driver-carried mobile device, onboard vehicle recording devices, vehicle communications hardware, host servers in communication with the vehicle, and mobile, host, and vehicle software applications resident on the driver-carried mobile device, onboard vehicle recording devices, and host servers, respectively.

Current onboard recorder systems require an HOS application to reside on the mobile device to perform HOS calculations and present HOS data to the driver. Current onboard systems are complex and costly. Changes in regulations and/or software changes require new software to be installed in the driver-carried mobile devices, vehicle recording devices, and/or host servers. As a result, maintenance of software across a vehicle fleet using current onboard systems is expensive for fleet owner/operators, which has resulted in limited adoption of the current systems. The multitude of different driver-carried mobile devices, such as smartphones, tablet computers, laptop computers, etc., with different device characteristics, such as screen size, resolution, memory, operating systems, etc. has also increased the cost of the current HOS systems because multiple native versions of the mobile software must be developed to operate on each different driver-carried mobile device. Additionally, drivers who use multiple driver-carried mobile devices, such as an original equipment manufacturer in-dash display, a personal smartphone, and a laptop computer are required to purchase and install several instances of the HOS software, one for each device, and maintain synchronous versions of the HOS software among the multiple devices.

While the vehicle is in operation, mobile workflow systems capture information onboard from vehicle computers, trailer computers, input from the driver, and/or other auxiliary inputs. This information is collected and generated onboard the vehicle and only later synchronized with the host systems using wireless communications. Systems today require the use of mobile computing and communication systems with onboard software that calculates HOS information, generates instructions to the driver, and reports actual events as they occur on the road. This method requires significant onboard processing and storage. These systems can also be costly to maintain and update since new software has to be transmitted to the mobile system wirelessly or installed manually when the operator can "catch and cable" the onboard system. The requirement to synchronize mobile and host applications adds complexity, cost, and errors to current fleet management systems.

SUMMARY

The systems, methods, and devices of the various embodiments provide hour-of-service ("HOS") calculations via a web based host instead of on an onboard mobile device. In the various embodiments, an onboard vehicle recording device and driver-carried mobile device(s) may operate independently. The onboard vehicle recording device and driver-carried mobile device(s) may exchange information independently with a host server rather than exchanging information together onboard the vehicle. In an embodiment, a driver may be confirmed to be associated with a vehicle based on an odometer reading.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
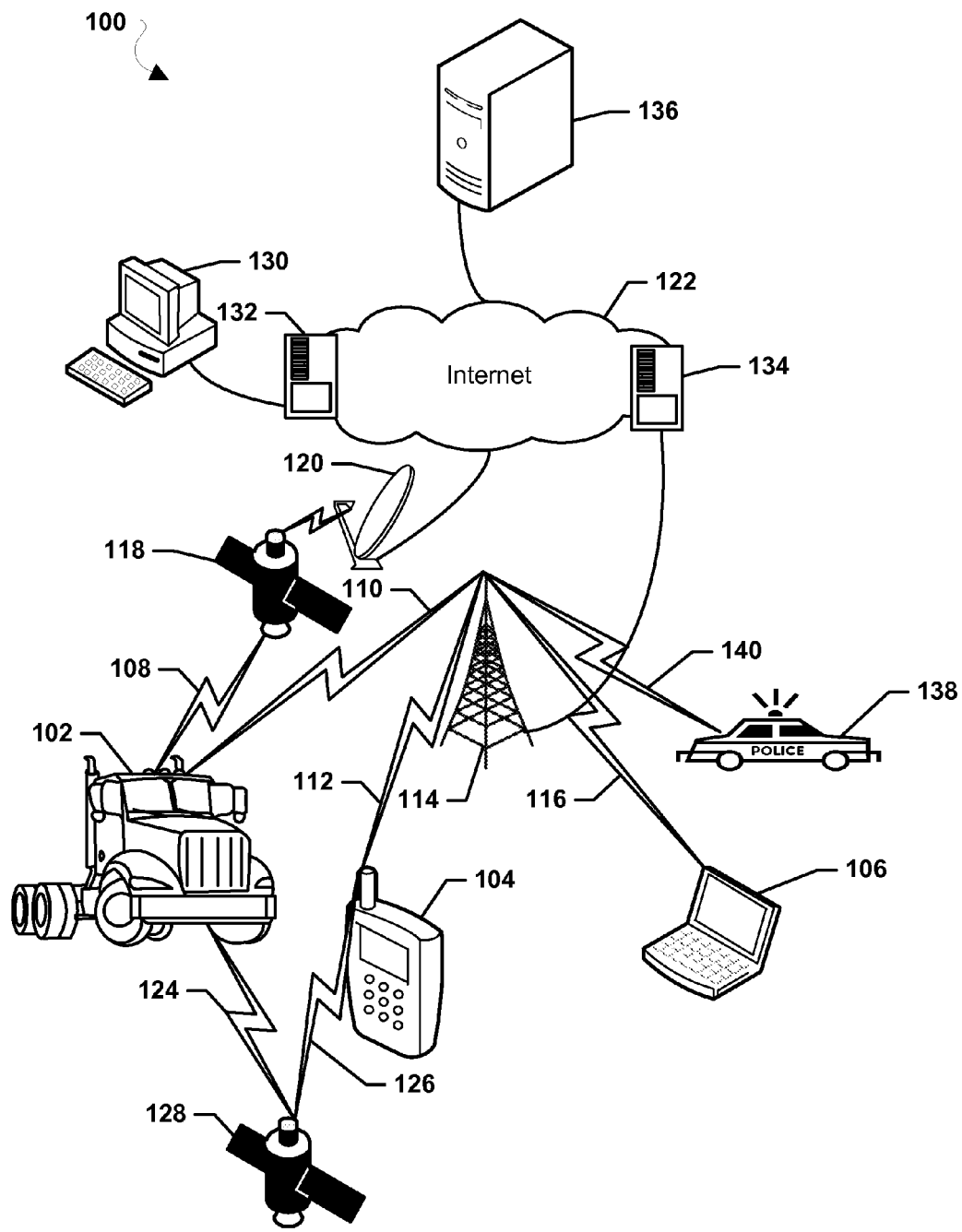
FIG. 1 is a communication system block diagram of a communication network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "mobile device" is used interchangeably herein to refer to any one or all of cellular telephones, smartphones, personal or mobile multi-media players, personal data assistants (PDA's), personal computers, laptop computers, tablet computers, smart books, palm-top computers, wireless electronic mail receivers, multimedia Internet enabled cellular telephones, wireless gaming controllers, in vehicle displays, computer kiosks, and similar personal electronic devices which include a programmable processor and memory and circuitry for receiving driver input, displaying a web browser, and connecting to the Internet.

As used herein, the term "onboard vehicle recording device" is used to refer to devices onboard a vehicle that are configured to receive sensor inputs of various vehicle sensors and provide vehicle performance data to another device off-board the vehicle. In an embodiment, an onboard vehicle recording device may be a standalone device. In another embodiment, an onboard vehicle recording device may be integrated with another device, such as an engine computer/controller. In an embodiment, the onboard vehicle recording device may connect to the vehicle data bus to capture, process, store, and transmit vehicle data.

The systems, methods, and devices of the various embodiments provide hour-of-service ("HOS") calculations via a web based host instead of on an onboard mobile device. In the various embodiments, an onboard vehicle recording device and driver-carried mobile device(s) may operate independently. The onboard vehicle recording device and driver-carried mobile device(s) may independently exchange information with a host server, rather than exchanging information between the two devices onboard the vehicle.

In an embodiment, the onboard vehicle recording device(s) may be synchronized with the vehicle and may record information, such as information required by 49 C.F.R. §§395. 15-16, including road speed and/or vehicle engine revolutions per minute ("RPM"). In an embodiment, the onboard vehicle recording device(s) may be in communication with various vehicle sensors, such as a speedometer, tachometer, fuel gauge, scale, odometer, accelerometer, compass, Global Positioning System ("GPS") receiver, etc., and may record information received from the various vehicle sensors as vehicle status information. In an embodiment, the onboard vehicle recording device may wirelessly transfer vehicle status information, such as vehicle motion and vehicle stops, to a host server running HOS software.

In an embodiment, a driver may interact with the host server and HOS software with a fixed or mobile device over a wireless connection using a standard web browser. Using the web browser, the driver may indicate log status changes, such as on-duty not driving, off duty, and/or sleeper berth, activities and/or status. In an embodiment, a driver's device may be an in vehicle device, such as an in cab display of an installed computing/entertainment system.

In an embodiment, the onboard vehicle recording device and driver's fixed or mobile device may interact with the host server independently, and HOS calculations may be made "off-board" by the host server, rather than by the onboard vehicle recording device or the driver's fixed or mobile devices. In an embodiment, the HOS software running on the host server may update an HOS database with the driver entered log status changes, and may automatically record drive status segments from the information automatically generated by the onboard vehicle recording device.

The independent operation of the onboard vehicle recording device and driver's device may lower the overall cost of the hardware necessary for implementing an HOS system, which may lead to greater adoption of HOS systems. The movement of processing and memory storage operations off-board to the host server may reduce and/or eliminate the need for expensive memory storage capability in the onboard vehicle recording device, which may lower the cost of the onboard vehicle recording device hardware. The use of a standard web browser for drivers to access the HOS software may enable a wider selection of devices and operating systems to be used, reducing development and deployment costs. Since new features may be made available via the server hosted web pages, this may eliminate or reduce the need to transmit software updates to the driver's mobile device. This may eliminate or at least reduce the need for costly software updates for the driver devices and bypass the need for application marketplaces. In an embodiment, since a web browser, rather than a native application, may be used to access the host server and no local communication between the driver device and onboard vehicle recording device occurs, any computing device with a compliant web browser and communication capabilities may be used as a driver device. In an embodiment, driver devices may include smartphones, tablet computers, in-dash displays, personal computers, laptop computers, and/or truck stop kiosks to name just a few examples.

In an embodiment, law enforcement officials may access HOS database information stored on the host server from a web enabled law enforcement vehicle, roadside inspection point, scale house, and/or office, without having to stop the vehicle or confront the driver. In an embodiment, proper security protocols may be implemented so that law enforcement officials may be required to provide proper credentials in order to gain access to the HOS database.

In an embodiment, fewer updates to Original Equipment Manufacturer ("OEM") onboard components may be needed because HOS calculation algorithms and logic may reside at the host server, which can be easily maintained and upgrades. In this manner, software patches, such as those required to implement or comply with changes in regulations, can be installed in the host server like any other software upgrade, eliminating or reducing the need to upgrade the onboard components since the onboard vehicle recording device may only perform operations of gathering and transmitting vehicle data. In an embodiment, the use of standard web browsers by the onboard vehicle recording device for transferring and accessing HOS information to/from the host server may further eliminate or reduce the need for original equipment manufacturers (OEMs) and vehicle dealers to maintain and/or install software patches to keep up with frequent changes in regulations.

Associating a vehicle and/or onboard vehicle recording device with a driver and/or driver-carried mobile device which is not tethered to the vehicle poses a challenge for current HOS systems. One approach to implementing untethered systems may be to use local area wireless technologies, such as Bluetooth or Wi-Fi wireless networks, to establish a communication link between the driver's mobile device and vehicle devices over which information may be exchanged and synchronized. However, this solution can be problematic because vehicles are often parked together (e.g., in a truck stop or operations center) and the range of local area wireless technologies can result in drivers selecting the wrong vehicle for synchronizing with their mobile device. One solution to the challenge of ensuring that drivers synchronize their mobile devices with the correct vehicle systems uses Bluetooth pairing or Wi-Fi associations that select the strongest signal through a series of algorithms. Another approach to ensuring that drivers synchronize their mobile devices with the correct vehicle systems presents drivers with a list of nearby vehicles and relies on the driver to select the proper vehicle or device for synchronizing/pairing. A further approach uses GPS to verify the proximity of the driver-carried device to a vehicle prior to or as part of the pairing process.

Associating or binding a vehicle to a driver-carried mobile device presents problems in a vehicle fleet management system, such as an HOS system, that relies on off board processing and does not create a direct local connection between a vehicle computer and the driver's mobile device. If the system relies only on the driver entering the vehicle identification number into the mobile device, problems can occur when drivers make data entry errors. Additionally, in systems that rely on a host server to perform the HOS processing interfacing with vehicle devices and the driver's mobile device(s) via a web browser, it may be difficult to confirm that a driver is in or operating a particular vehicle. If the driver is remotely running the fleet management application, such as an HOS application, computing device specific hardware and/or hardware functions (e.g., GPS, Bluetooth or Wi-Fi) may not be available on the device and/or available to the web browser for authentication of the driver and/or the vehicle. A driver associated with the wrong vehicle may create problems for the operator and the fleet management system because the driver's HOS logs would not match the vehicle performance data in the HOS database. Managing and resolving such problems may increase operations costs.

In an embodiment, the driver-to-vehicle registration problem may be solved by using the odometer reading on the vehicle dashboard as an authentication number or code to confirm that the driver is in a particular vehicle. In an embodiment, the odometer reading on the vehicle dashboard may be used as a second level authentication that the driver is in a particular vehicle, with authentication also based on a vehicle identifier, a driver identifier and/or a driver authentication code. The odometer reading on vehicles change as they are driven, creating an easy to access and sufficiently unique value for a specific vehicle. The odometer reading may be available to the engine computer/controller and/or an onboard vehicle recording device, and thus serves as a quasi-unique value known to the vehicle devices. The odometer reading is easily accessible to the driver from the driver's seat, and thus is a handy number that the driver can see and enter into the driver's mobile device(s). In an embodiment, the combination of a truck identification number, which may be unique for a fleet, and the dash odometer reading entered by the driver provides a unique number that may be used to determine/confirm that the driver is actually in the driver's seat of a particular vehicle at a point in time. In an embodiment, a web form presented on the browser of the driver's mobile device may prompt the driver to enter the vehicle identification number and the vehicle odometer reading. This data received in the web form may be sent to the host server via a communication network using standard hypertext transfer protocol ("HTTP") or other Internet protocol methods. In an embodiment, at the end of every vehicle motion stop event the onboard vehicle recording device may transmit the odometer reading of the vehicle to the host server. The vehicle odometer reading may be captured from the vehicle data bus (e.g., OBDII, J1708, J1939, etc.). In an embodiment, the host server may compare the odometer reading last received from the onboard vehicle recording device and/or stored at the host server with the odometer reading entered by the driver to determine whether the readings matched. When the driver entered odometer reading (and optionally vehicle identification number) match the vehicle data stored in the host server, the driver and/or vehicle may be authenticated and the association made for fleet management applications, such as Hours-of-Service, Workflow, Proof-of-Delivery, Driver Feedback, and/or other applications.

In an embodiment, after binding the driver mobile device and the vehicle, the driver's mobile device may also be associated with the plurality of devices associated with the vehicle, such as the vehicle' onboard computer, engine computer/controller, sensor networks (tires, seat belts, etc.), trailer systems, and/or cargo management/monitoring systems. In an embodiment, once the association driver-to-vehicle association has been established the host server may establish a virtual connection between the IP addresses of the driver's mobile device(s), the vehicle, and the plurality of devices associated with the vehicle. Through such a virtual connection, the host server may receive driver and vehicle data from any and all of the driver and vehicle devices, maintain status and log data, and transmit status and data access displays to the various devices through their respective web browser interfaces with the host server acting as a virtual router. In this manner, driver and vehicle data may appear to pass directly from the vehicle computers to the driver's mobile device, and vice versa, as if the devices were all directly connected together and operating interactively. The exchange of data via the host server may enable driver and/or vehicle data to be exchanged between the various devices on a timely basis to support driver feedback applications, native applications running on the driver display, and/or widget based controls. This exchange of data via the host server enables such interactive operations even though the drivers' mobile device(s) and the vehicle devices are operating independently.

In an embodiment, odometer reading authentication may be used to grant temporary access to a host server for law enforcement personnel. Thus, during an inspection stop, the driver could provide the odometer reading to law enforcement personnel (or law enforcement personnel could read the odometer directly), along with other identifying information (e.g., driver identification number, and/or vehicle identification number ("VIN"), etc.). The law enforcement personnel may then use the combination of the odometer reading, driver identification number, and/or vehicle ID as data entered into a web portal as part of an authentication routine to authenticate their right to access records for the driver and/or vehicle maintained on the host server. In this manner, the host server can verify that the law enforcement personnel have indeed stopped the vehicle for which they are requesting data access, and on that basis grant temporary HOS database access for the particular vehicle and/or driver.

In another embodiment, a unique identifier may be placed on the backside of the sunshade, above the windshield, and/or elsewhere inside the vehicle, and entry of this unique identifier in a web data entry screen presented on a web browser may be used by the host server as a second level authentication that the driver or law enforcement personnel are in the particular vehicle. The unique identifier may not be a preferred embodiment because the unique identifier does not change and may also be removed, which is why the use of the odometer reading, perhaps in combination with the vehicle's unique identifier, may provide security advantages.

In a further embodiment, another layer of security may be added by supplying the driver with a security key, such as an RSA key, with a rolling security code. Since the driver would carry the driver device with the rolling code on it, this may add to the validity of the authentication process.

The various embodiments use of a host server to store HOS data and perform HOS-type processing, and host driver and vehicle applications provide a number of advantages. Off-board processing at the host server may be used to synchronize fleet management databases with information from the onboard vehicle recording device and the driver device. Using off-board processing that synchronizes and shares data between the onboard vehicle recording device and driver device, a fleet management database and driver workflow system may be established. Vehicle data, such as times of vehicle starts and stops, odometer readings, engine hour logs, sensors readings, speed, engine revolutions per minute, mileage, fuel level, vehicle weight, engine operation time, GPS location, acceleration and driver feedback, may be combined and presented to the driver as work instructions. Using a web browser implemented on the driver's mobile device(s) and/or a vehicle dashboard device, the driver may be associated with their driver device and the driver may use an application, such as a workflow and/or HOS application, across multiple device types and operating systems. In this manner, any computing device supporting a web browser may act as driver device, increasing the number of possible devices that may be used with a fleet management system. This compatibility with any number of commercial computing devices may lower overall system cost, by eliminating the need for custom devices. Because both the vehicle/driver data and applications may reside at the host server, a step of vehicle device data with the driver device may not be required. Because a standard web browser may be used to access data, development time of workflow solutions may be reduced since standard tools and languages may be employed. Software distribution of workflow applications may not be required since the driver's computing device may access via the Internet data or displays generated by a workflow application running on the host server rather than locally running such applications on the driver device. Workflow applications are easier to maintain in the various embodiments since the host server applications are readily available for maintenance and upgrade. Additionally, only one version of host software may need to be updated and/or changed reducing software costs while supporting a wide range of driver and vehicle computing devices. Software costs may be reduced because no software may need to be transmitted or download to the driver devices. Off-board processing may provide drivers with out-of-cab access to the fleet management system. Because the driver need not be tethered to the vehicle (e.g., using a wired or wireless data link), a driver may transact with the vehicle system anytime, anyplace, using the Internet, which may be useful for in building deliveries, access from home, and/or access from a truck stop. Driver device replacement may be improved and less robust driver devices may be used, because if a driver device fails a driver may still gain access to the fleet management system using a smartphone or acquire any device with an Internet browser.

FIG. 1 illustrates a wireless network system 100 suitable for use with the various embodiments. The wireless network system 100 may include an onboard vehicle recording device 102 installed onboard a vehicle, such as a heavy-duty truck, a driver-carried mobile device 104, such as a smartphone, and a host server 136 connected to the Internet 122. The onboard vehicle recording device 102 may establish a wireless connection 108 with a satellite communication system 118, such as a geostationary communication satellite and/or a low earth orbit satellite communication system (e.g., the Iridium satellite communication system, Orbcomm satellite communication system, etc.). The satellite communication system 118 may be in communication with a base station 120 which may connect to the Internet 122. Additionally or alternatively, the onboard vehicle recording device 102 may establish a wireless connection with a cellular wireless communication system tower or base station 114, and exchange data via a cellular connection 110, including CDMA, TDMA, GSM, PCS, 3G, 4G, LTE, or any other type wireless communication technology. The cellular tower or base stations 114 may be in communication with a server or router 134 that may provide interconnectivity to the Internet 122. In this manner, via a satellite communication system 118 and/or a terrestrial wireless communication system including base stations 110, and the Internet 122, data may be exchanged between onboard vehicle recording devices 102 and the host server 136. The onboard vehicle recording device 102 may also receive location signals 124, such as Global Positioning System ("GPS") location signals, from a positioning or navigation system 128, such as the GPS system.

The driver-carried mobile device 104 and a cellular tower or base station 114 may exchange data via a cellular connection 112, including CDMA, TDMA, GSM, PCS, 3G, 4G, LTE, or any other type of wireless data link technology. In this manner, via the connection to the cellular tower or base station 110, and/or Internet 122, data may be exchanged between the driver-carried mobile device 104 and the host server 136. The driver-carried mobile device 104 may also receive location signals 126, such as GPS location signals, from a positioning system 128, such as the GPS system. Additionally, another driver-carried mobile computing device 106, such as a laptop computer, may exchange data with the cellular tower or base station 114 via cellular connection 116, including CDMA, TDMA, GSM, PCS, 3G, 4G, LTE, or any other type of wireless data link technology. In this manner, via the connection to the cellular tower or base station 114, and/or Internet 122, data may be exchanged between another driver-carried mobile device 106 and the server 136.

A fixed computing device 130, such as a personal computer and/or truck stop kiosk, may be in communication with a router 132 that may provide interconnectivity with the Internet 122. In this manner, via the connection to the router 132 and/or Internet 122, data may be exchanged between the fixed device 130 and the server 136.

A law enforcement device 138, such as a computer within a law enforcement vehicle, or a law enforcement computer at a roadside inspection point, scale house, and/or a law enforcement office, may also connect with the Internet 122 via a wired or wireless Internet connection, and receive access to driver and/or vehicle data maintained on the host server 136.

In an embodiment, a driver computing device may include a vehicle installed computing/entertainment system with a display, such as an in dash display. The vehicle installed computing/entertainment system may communicate with the cellular base station 114, router 134, satellite communication system 118, base station 120, Internet 122, and/or server 136 in a manner similar to that of the onboard vehicle recording device 102 described above.

Figure 2:
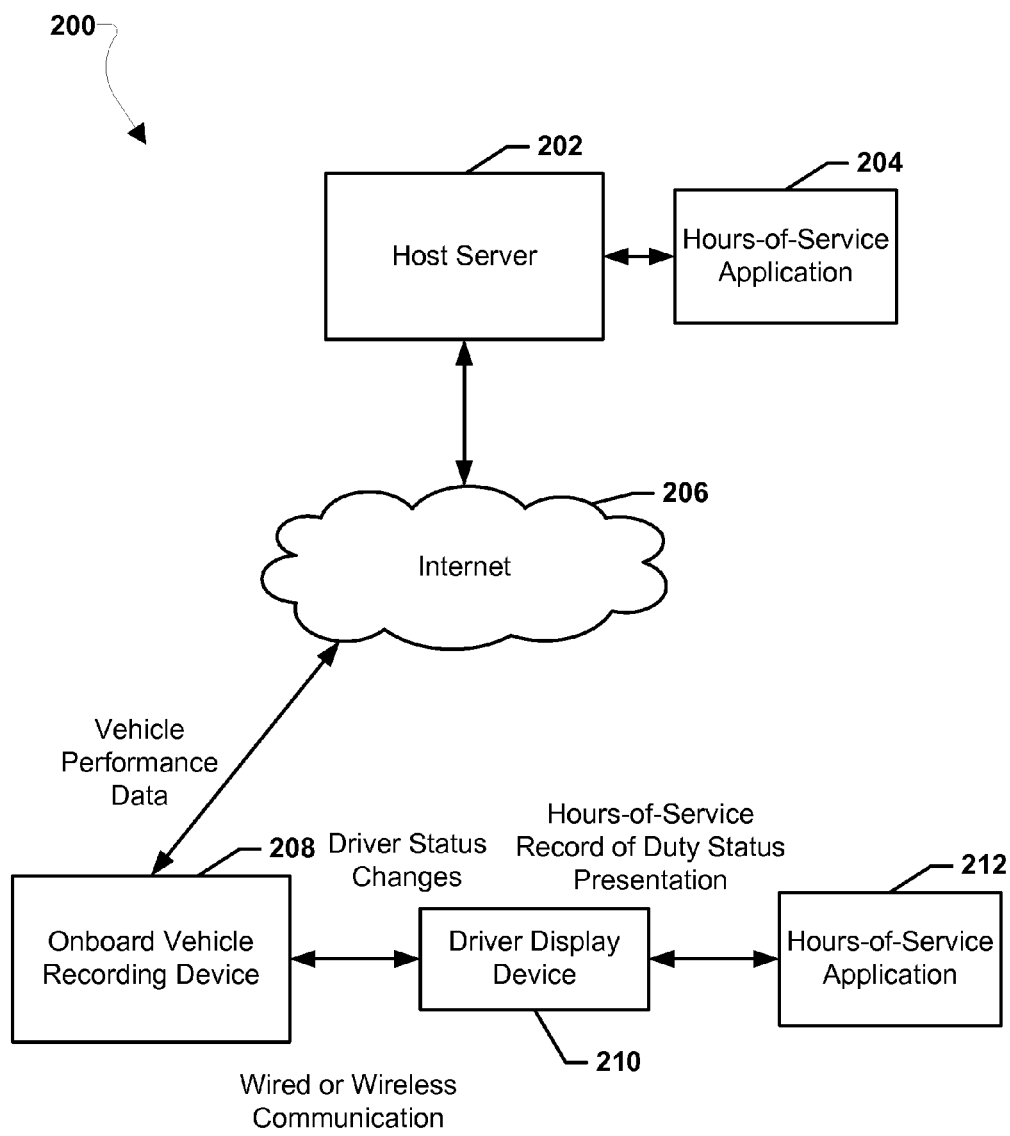
FIG. 2 is a system block diagram of a current HOS system.

FIG. 2 illustrates components of a current onboard HOS system 200. FIG. 2 illustrates the current relationship between a host server 202, onboard vehicle recording device 208, and driver display device 210. In current HOS systems 200, the driver display device 210 communicates, via a wired or wireless communication link, with the onboard vehicle recording device 208. Information is exchanged directly between the onboard vehicle recording device 208 and the driver display device 210 with an HOS application residing, at least on the driver display device 210. The current HOS system 200 performs both HOS and record of duty calculations onboard the vehicle using the HOS application running on the driver display device 210. In the current HOS system 200, vehicle performance data and driver status changes are sent from the onboard vehicle recording device 208 to the host server 202 via the Internet 206. The host server 202 runs its own HOS application 204. In the current HOS system 200, the multiple versions of HOS applications 204, 212, and the required interface between the driver display device 210 and onboard vehicle recording device 208 add cost and complication to the design and operation of the current HOS system 200.

Figure 3:
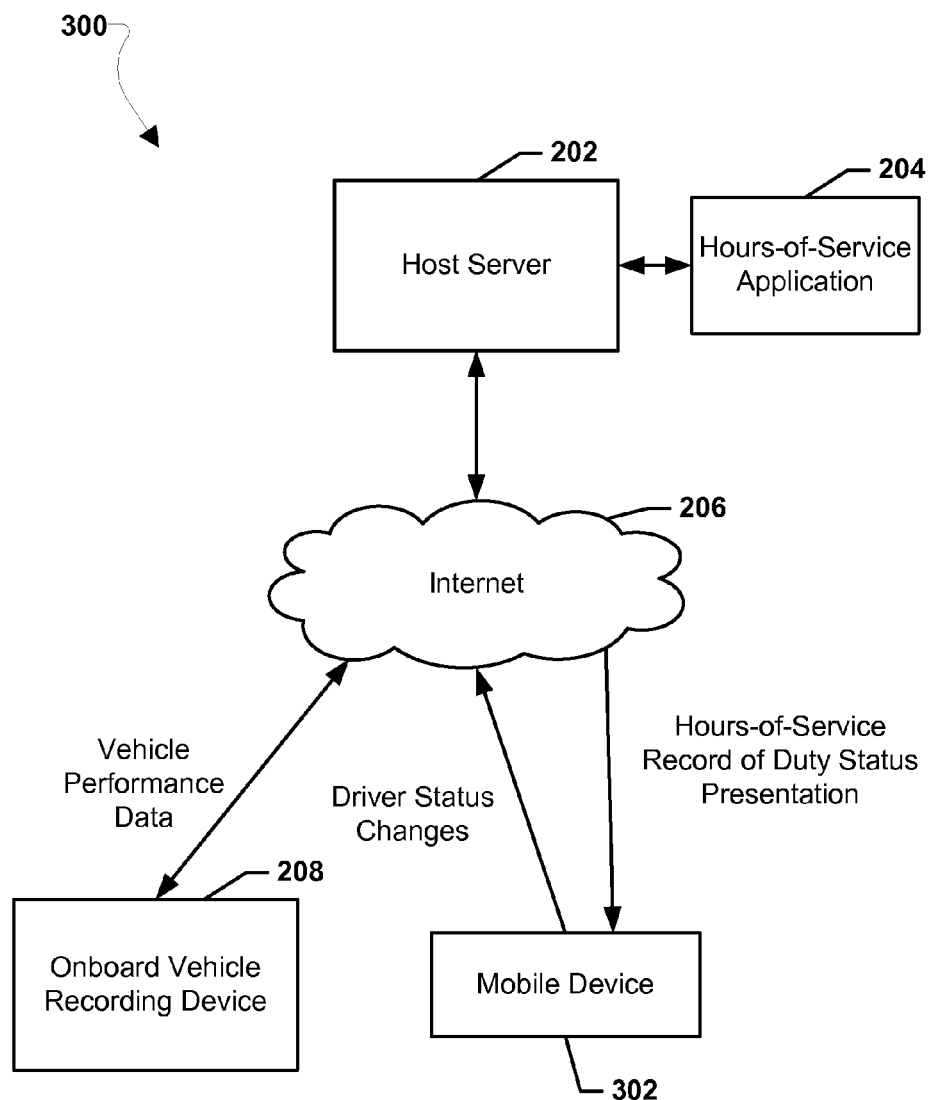
FIG. 3 is a system block diagram of an HOS system according to an embodiment.

FIG. 3 illustrates an embodiment HOS system 300. The embodiment HOS system 300 differs from the current HOS system 200 described above with reference to FIG. 2 in that a driver-carried mobile device 302 may not have an HOS application, and instead may access the Internet 206 to exchange information with the host server 202. Unlike the driver display device 210, the driver-carried mobile device 302 may not exchange data with the onboard vehicle recording device 208, the driver-carried mobile device 302 may not perform HOS calculations, and the driver-carried mobile device 302 may not run an HOS application 212. In the HOS system 300 the driver-carried mobile device 302 may send driver status changes to the host server 202 via an available communication link to the Internet 206 (e.g., cellular data link or Wi-Fi), and may receive from the host server 202 HOS record of duty status presentations, such as reports, graphs, displays, pages, etc. In this manner, the driver-carried mobile device 302 may not require an HOS application resident on the driver-carried mobile device 302. In an embodiment, a standard web browser may enable the driver to view input driver status changes and view HOS presentations using any type driver-carried mobile device 302 having a data communication link to the Internet 206 and a web browser. In an embodiment, the onboard vehicle recording device 208 may receive instructions from the host server 202 via the Internet 206 and provide vehicle performance data to the host server 202 via the Internet 206. Such vehicle performance data may include one or more of speed, engine revolutions per minute, mileage, vehicle ID, trailer ID, fuel level, vehicle weight, engine operation time, GPS location, and acceleration. In this manner, the onboard vehicle recording device 208 and the driver-carried mobile device 302 may operate independently, and an HOS database may be maintained at the host server 202 without requiring communications between the driver-carried mobile device 302 and the onboard vehicle recording device 208.

Figure 4:
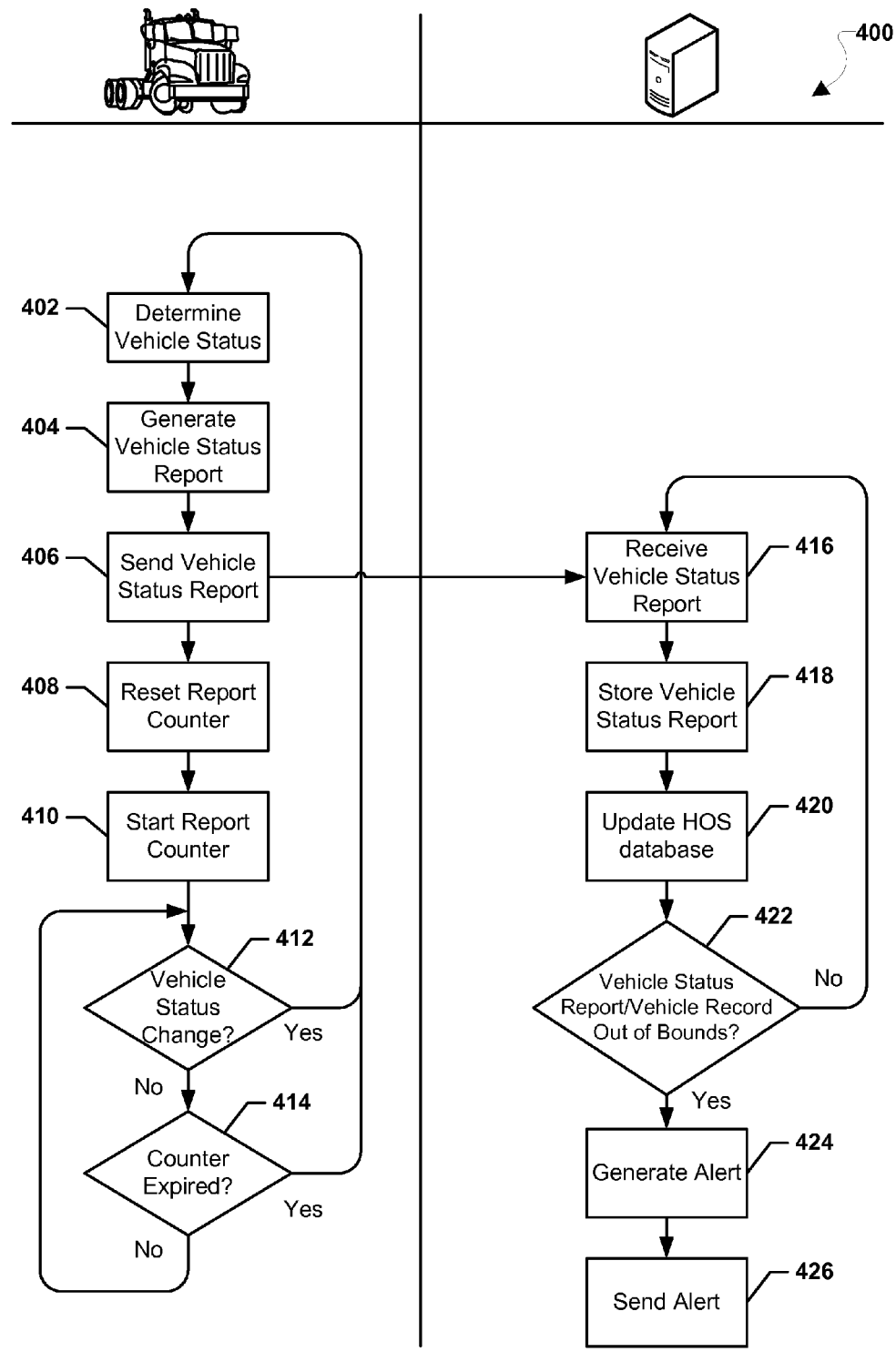
FIG. 4 is a process flow diagram illustrating an embodiment method for automatically updating an HOS database with vehicle status information.

FIG. 4 illustrates an embodiment method 400 for automatically updating an HOS database with vehicle status information. In an embodiment, the operations of method 400 may be performed by the processor of an onboard vehicle recording device, such as an onboard vehicle recording device installed in a heavy-duty truck, and the processor of a server, such as a host server running an HOS application to maintain an HOS database.

In block 402, the onboard vehicle recording device processor may determine the vehicle's status. In an embodiment, the onboard vehicle recording device processor may receive inputs from one or more various sensors installed in the vehicle, such as such as a speedometer, tachometer, fuel gauge, scale, odometer, accelerometer, compass, GPS receiver, etc., and may use the received sensor inputs to determine an appropriate descriptor of the vehicle's current status, such as "moving", "stopped", "on", "off", "idle", "North", "Northwest", etc. As an example, the onboard vehicle recording device may compare a received sensor input to a table stored in a memory of the onboard vehicle recording device to correlate a sensor input to a vehicle status descriptor. In another embodiment, the data received from the one or more various sensors themselves, may be determined to be the vehicle's status. As an example, the speedometer may indicate the road speed is 25 miles per hour, and the vehicle status may be determined to be 25 miles per hour. In block 404 the onboard vehicle recording device processor may generate a vehicle status report. In an embodiment, a vehicle status report may be a message including the vehicle's determined status and/or raw sensor inputs. In particular, the vehicle status report may include vehicle performance data, such as one or more of speed, engine revolutions per minute, mileage, vehicle ID, trailer ID, fuel level, vehicle weight, engine operation time, GPS location, and acceleration. In further embodiments, a vehicle status report may include additional information as discussed further below. In a further embodiment, the vehicle status report may contain only raw or lightly processed vehicle sensor data, and the host server may be configured to determine the vehicle's status directly from the sensor data.

In block 406 the onboard vehicle recording device processor may send the vehicle status report to the host server. In an embodiment, the vehicle status report may be sent using Internet protocols via a web browser. In another embodiment, the vehicle status report may be sent as a formatted message, such as an email, text message, etc. In block 408 the onboard vehicle recording device processor may reset a report counter. In an embodiment, the report counter may be a countdown type counter that may be tied to an internal clock of the onboard vehicle recording device processor. In an embodiment, the countdown duration (i.e., the reporting period) may be set to a minimum time between vehicle status determinations, such as a minimum time set in device settings, vehicle fleet operating procedures, and/or applicable regulations. In block 410, the onboard vehicle recording device processor may start the report counter.

In determination block 412 the onboard vehicle recording device processor may determine whether the vehicle's status has changed since a previous status determination. In an embodiment, the onboard vehicle recording device processor may compare the last received sensor input from a sensor to a current sensor input, and a difference between the sensor inputs may indicate a status change. In another embodiment, specific sensors readings may indicate a status change (e.g., a starter motor sensor), and receipt of sensor input from those sensors may be recognized by the processor as a status change. If the vehicle's status has not changed (i.e., determination block 412="No"), in determination block 414 the onboard vehicle recording device processor may determine whether the report counter has expired. If the report counter has not expired (i.e., determination block 414="No"), in determination block 412 onboard vehicle recording device may continue to monitor for a vehicle status change.

If the vehicle's status has changed (i.e., determination block 412="Yes") or the report counter has expired (i.e., determination block 414="Yes"), in block 402 the onboard vehicle recording device processor may poll the various vehicle sensors or stored sensor data and use that information to determine the vehicle's status. In block 404, the onboard vehicle recording device processor may generate another vehicle status report, and in block 406 the onboard vehicle recording device processor again send the new vehicle status report to the host server. In this manner, vehicle status may be continually determined and provided to the host server.

In block 416 the host server processor may receive the vehicle status report from the onboard vehicle recording device. In block 418 the host server processor may store the received vehicle status report in a memory available to the host server. In block 420 the host server processor may update the HOS database. In an embodiment, the host server processor may update the HOS database by adding additional records and/or overwriting records associated with the vehicle and/or driver associated with the vehicle. In this manner, a current status of the vehicle may be maintained and made available at the host server.

In determination block 422 the host server processor may determine whether the vehicle status report and/or the vehicle record associated with the vehicle is out of bounds. In an embodiment, a vehicle status report may be out of bounds if some information included in the vehicle status report and/or vehicle record is above, below, and/or equal to a threshold value. As an example, a fleet operator may set a maximum speed for their vehicle at 80 miles per hour, in which a vehicle status report indicating a vehicle traveling 100 miles per hour would be recognized as being out of bounds. As another example, a maximum engine operating time may be set for each vehicle, in which case a vehicle record indicating the engine operating time is within five percent of the maximum operating time would be recognized as being out of bounds. In various embodiment, out of bounds threshold values may be defined based on operator settings and technical or regulatory considerations, such as federal and state regulations, user settings, fleet settings, equipment capabilities, etc. If the vehicle status report and/or vehicle record is not out of bounds (i.e., determination block 422="No"), the host server processor may return to block 416 to continue receiving further vehicle status reports.

If the vehicle status report and/or vehicle record is determined to be out of bounds (i.e., determination block 422="Yes"), in block 424 the host server processor may generate an alert. In an embodiment, an alert may be a message indicating the value that is out of bounds. In an embodiment, an alert may be an email, text message, automated phone call, web browser pop-up, executable code segment, a message transmitted via the vehicle's onboard computing device, etc. In an embodiment, the alert may include information such as the value that is out of bounds, the amount it is out of bounds, a vehicle ID, driver ID, instructions or directions to the driver, or other information. In block 426 the host server processor may send the alert to the onboard vehicle recorded device and/or the driver's mobile computing device. In a further embodiment, the alert may be sent to a vehicle fleet operator's computer, a law enforcement server, or a combination of parties and/or computing devices.

Figure 5:
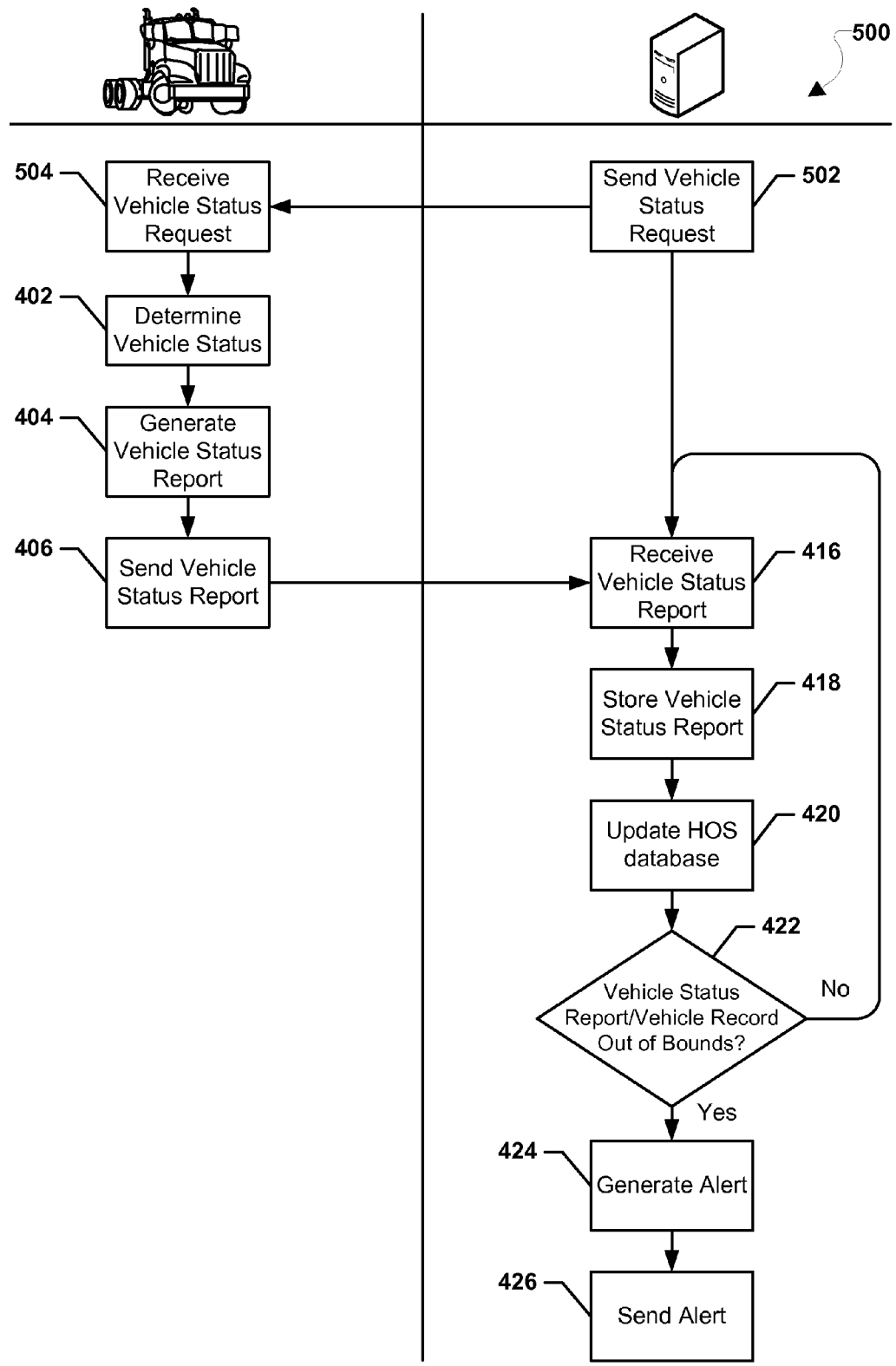
FIG. 5 is a process flow diagram illustrating an embodiment method for updating an HOS database with vehicle status information in response to a vehicle status request.

FIG. 5 illustrates an embodiment method 500 for automatically updating an HOS database with vehicle status information similar to method 400 described above with reference to FIG. 4, except that in method 500 the vehicle's status may be determined in response to a vehicle status request from the host server processor. In an embodiment, the operations of method 500 may be performed by the processor of an onboard vehicle recording device, such as an onboard vehicle recording device installed in a heavy-duty truck, and the processor of a server, such as a host server running an HOS application and maintaining an HOS database.

In block 502 the host server processor may send a vehicle status request to the onboard vehicle recording device. In an embodiment, the vehicle status request may be sent based on vehicle fleet settings and/or regulations, such as minimum reporting requirements. In an embodiment, the vehicle status request may be a message sent from the host server processor to the onboard vehicle recording device processor via the Internet, such as a message, command, or data file. In block 504 the onboard vehicle recording device may receive the vehicle status request. In response to receiving the vehicle status request, in blocks 402, 404, and 406 the onboard vehicle recording device processor may perform operations of like numbered blocks of method 400 described above with reference to FIG. 4 to send a vehicle status report to the host server. In blocks 416, 418, 420, 422, 424, and 426 the host server processor may perform operations of like numbered blocks of method 400 described above with reference to FIG.

Figure 6:
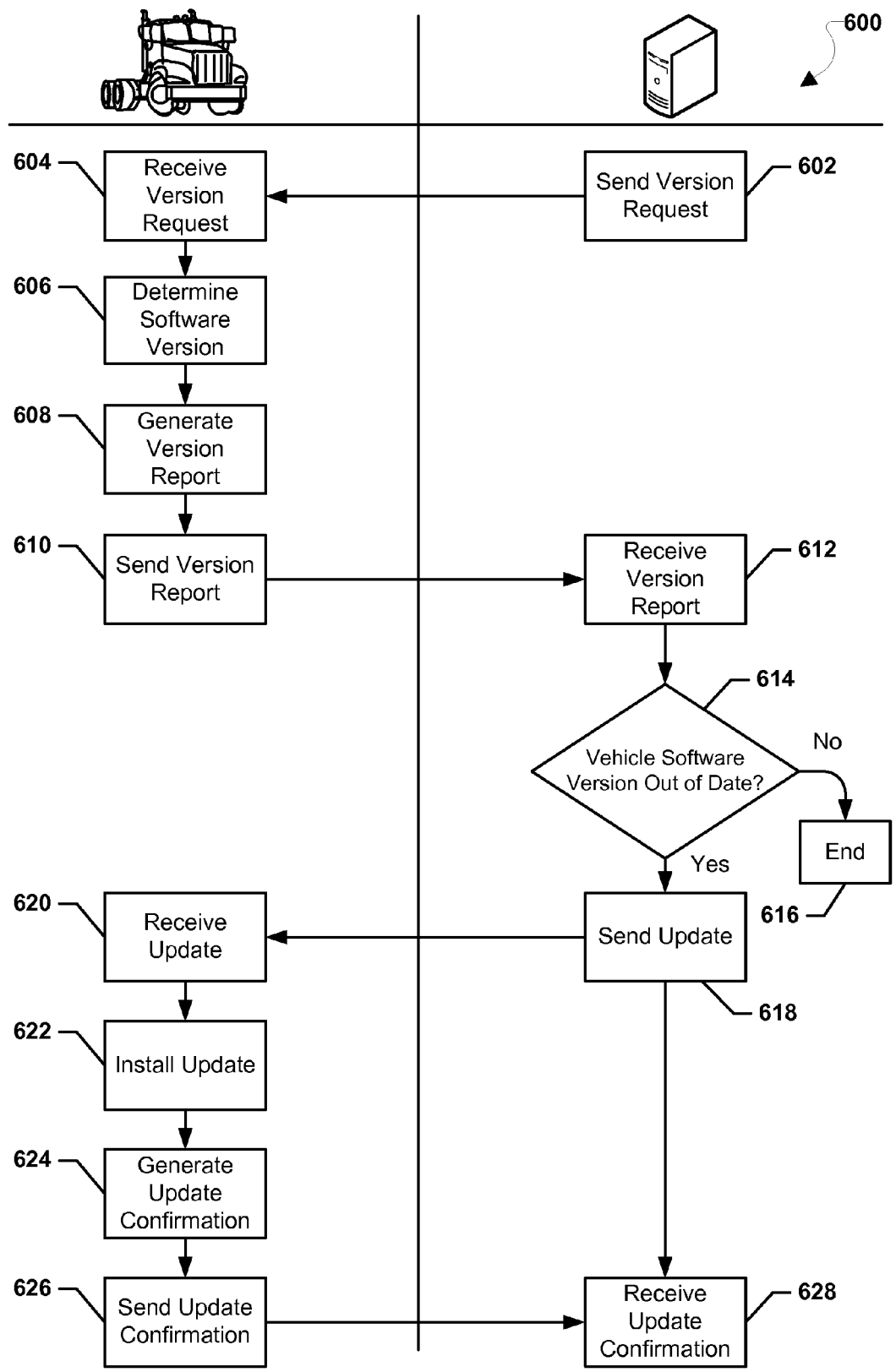
FIG. 6 is a process flow diagram illustrating an embodiment method for updating vehicle recording device software.

FIG. 6 is illustrates an embodiment method 600 for updating onboard vehicle recording device software. In an embodiment, the operations of method 600 may be performed by the processor of an onboard vehicle recording device, such as an onboard vehicle recording device installed in a heavy-duty truck, and the processor of a server, such as a host server running an HOS application to maintain an HOS database. In block 602 the host server processor may send a version request to the onboard vehicle recording device. In an embodiment, the version request may be a message requesting the onboard vehicle recording device processor provide the version of the software operating on the onboard vehicle recording device. In block 604 the onboard vehicle recording device processor may receive the version request. In response to receiving the version request, in block 606 the onboard vehicle recording device processor may determine the software version and at block 608 may generate a version report. In an embodiment, the version report may include information related to the version of software running on the onboard vehicle recording device processor, such as the version number. In an embodiment, the version report may be a message, such as an email, text message, etc. In block 610 the onboard vehicle recording device processor may send the version report to the host server.

In block 612 the host server processor may receive the version report. In determination block 614 the host server processor may determine whether the vehicle software version is out of date. In an embodiment, the host server processor may compare the most current software version number to the version number contained in the version report to determine whether the vehicle software version is out of date. If the version is not out of date, (i.e., determination block 614="No"), in block 616 the method 600 may end. If the version is out of date (i.e., determination block 614="Yes"), in block 618 the host server may send a software update to the onboard vehicle recording device. In an embodiment, the software update may be a complete new version of the software. In another embodiment, the software update may be a partial update, such as a software patch.

In block 620 the onboard vehicle recording device processor may receive the update, and in block 622 the onboard vehicle recording device processor may install the update. In block 624 the onboard vehicle recording device processor may generate an update confirmation. In an embodiment, the update confirmation may be a message indicating the updated version number of the software and/or a successful install of the update. In block 626 the onboard vehicle recording device processor may send the update confirmation to the host server. In block 628 the host server processor may receive the update confirmation. In this manner, the host server processor may be informed that the onboard vehicle recording device was successfully updated.

Figure 7:
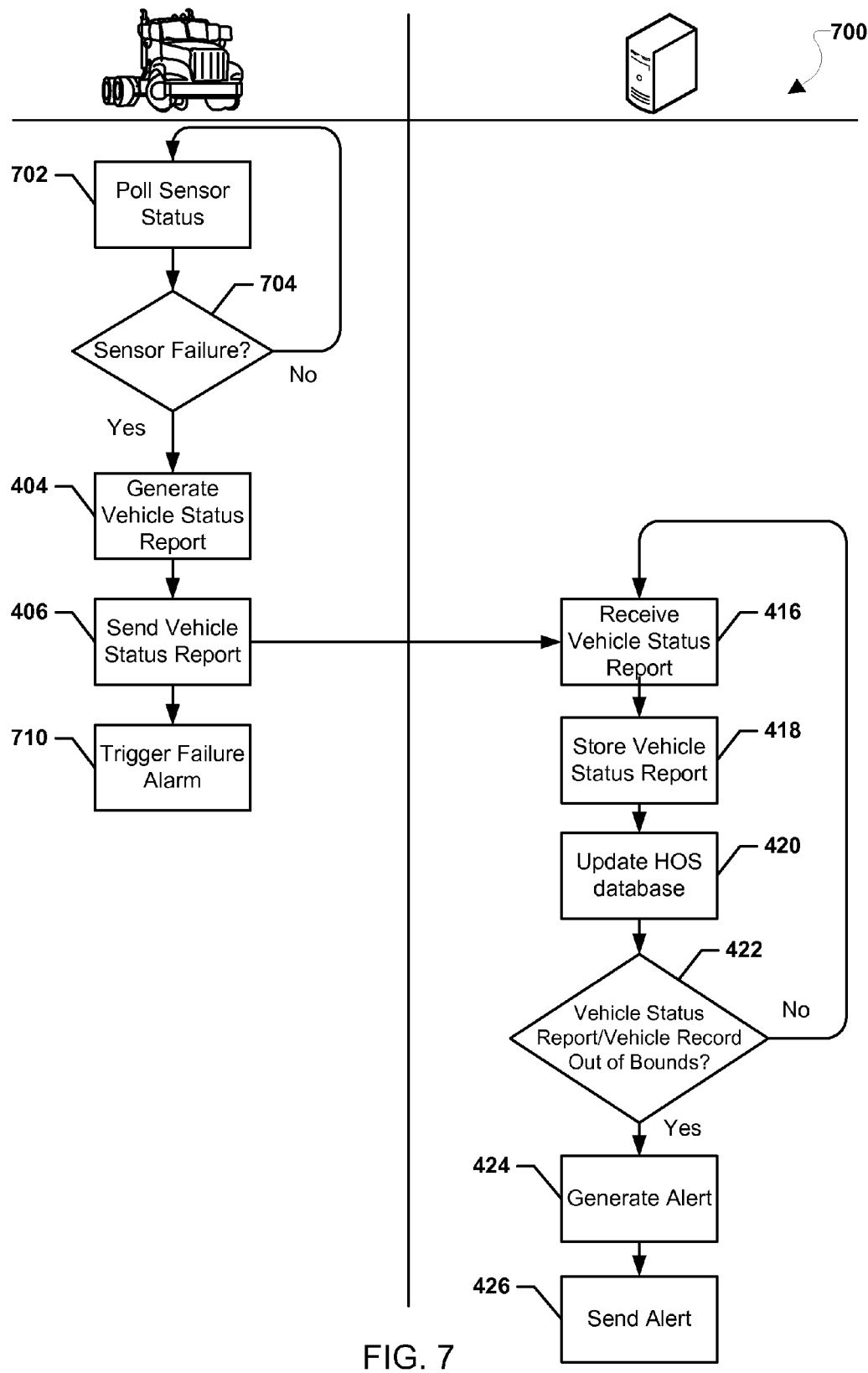
FIG. 7 is a process flow diagram illustrating an embodiment method for triggering a sensor failure alarm.

FIG. 7 illustrates an embodiment method 700 for triggering a sensor failure alarm. In an embodiment, the operations of method 700 may be performed by the processor of an onboard vehicle recording device, such as an onboard vehicle recording device installed in a heavy-duty truck, and the processor of a server, such as a host server running an HOS application to maintain an HOS database. In block 702 the onboard vehicle recording device processor may poll one or more sensors of the vehicle to determine the one or more sensor's status. In an embodiment, the onboard vehicle recording device processor may send a signal to one or more sensors of the vehicle to request a sensor reading and/or diagnostic report from the one or more sensors. In determination block 704 the onboard vehicle recording device processor may determine whether any sensor on the vehicle has failed. In an embodiment, sensor failure may be indicated by a failure of a sensor to respond to a status polling request, an error indication received from a sensor, and/or an incorrect format input from a sensor. If a sensor has not failed (i.e., determination block 704="No"), in block 702 the onboard vehicle recording device processor may continue to poll sensors of the vehicle. In this manner, the onboard vehicle recording device processor may continually poll sensors and identify potential sensor failures.

If a sensor has failed (i.e., determination block 704="Yes"), as discussed above, in block 404 and 406 the onboard vehicle recording device processor may perform operations to generate and send a vehicle status report to the host server. In an embodiment, the vehicle status report may include an indication of the sensor that has failed and/or the nature of the failure. In block 710 the onboard vehicle recording device processor may trigger a failure alarm. In an embodiment, a failure alarm may be an audible indication and/or a visual indication generated by the onboard vehicle recording device processor to indicate to a driver of the vehicle that a sensor has failed. In blocks 416, 418, 420, 422, 424, and 426 the host server processor may perform operations of like numbered blocks of method 400 described above with reference to FIG. In this manner, in an embodiment an alert may be sent indicating a sensor failure has occurred. In an embodiment, the alert may be sent to a driver device, a vehicle fleet operator, and/or law enforcement officials.

Figure 8:
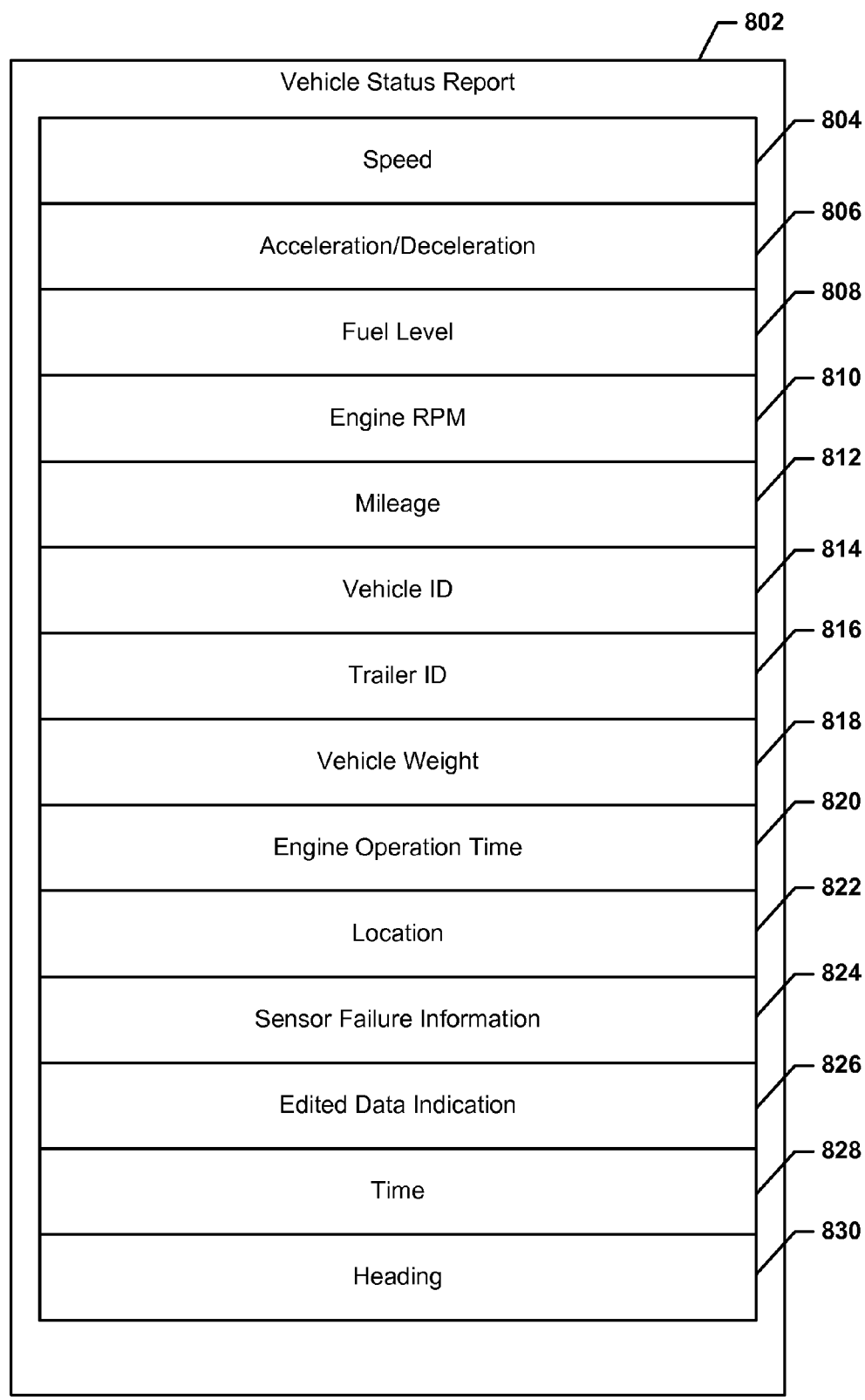
FIG. 8 is a data structure diagram illustrating potential elements of a vehicle status report.

FIG. 8 illustrates an embodiment vehicle status report 802. In an embodiment, the vehicle status report 802 may include a speed indication 804. As an example, the speed indication 804 may be the vehicle's road speed as determined by the speedometer. In an embodiment, the vehicle status report 802 may include an acceleration/deceleration indication 806. As an example, the acceleration/deceleration indication 806 may be the vehicle's acceleration/deceleration rate as determined by an accelerometer on the vehicle. In an embodiment, the vehicle status report 802 may include a fuel level indication 808. As an example, the fuel level indication 808 may be an indication of the fuel remaining in the vehicle's fuel tank as determined by a fuel gauge. In an embodiment, the vehicle status report 802 may include an engine RPM indication 810. As an example, an engine RPM indication 810 may be an indication of the engine's RPM as determined by a tachometer. In an embodiment, the vehicle status report 802 may include a mileage indication 812. As an example, a mileage indication 812 may be an indication of total vehicle miles traveled and/or trip vehicle miles traveled as determined by the vehicle's odometer. In an embodiment, the vehicle status report 802 may include a vehicle ID 814. As an example, a vehicle ID 814 may be the vehicle's United States Department of Transportation ("DOT") number. In an embodiment, the vehicle status report 802 may include may a trailer ID 816. As an example, a trailer ID 816 may be the trailer's license plate number, shipping document number, and/or container number.

In an embodiment, the vehicle status report 802 may include a vehicle weight indication 818. As an example, a vehicle weight indication 818 may be a value generated by a scale of the vehicle and/or a vehicle weight input into the onboard vehicle recording device based on a drive on truck scale measurement. In an embodiment, the vehicle status report 802 may include an indication of engine operation time 820. As an example, an engine operation time indication 820 may be an indication of the total time the vehicle engine has operated over its manufacture life and/or over the current engine on period. In an embodiment, the vehicle status report 802 may include a location indication 822. In an embodiment, a location indication 822 may be GPS location information received from a GPS transceiver of the vehicle. In an embodiment, the vehicle status report 802 may include sensor failure information 824. As an example, sensor failure information 824 may be an indication that a specific sensor has failed and/or the nature of the failure. In an embodiment, the vehicle status report 802 may include an edited data indication 826. As an example, an edited data indication 826 may be an indication that at least a portion of the data in vehicle status report 802 may have been edited prior to generating and/or sending the vehicle status report 802. In an embodiment, the vehicle status report 802 may include an indication of time 828 at which the vehicle status report 802 was generated. In an embodiment, the vehicle status report 802 may include an indication of the vehicle's heading 830. In an embodiment, multiple consecutive location indications may be used by the onboard vehicle recording device processor to extrapolate a likely heading 830, such as "North" or "North West." In another embodiment, a heading 830 may be determined by a compass installed in the vehicle.

Figure 9:
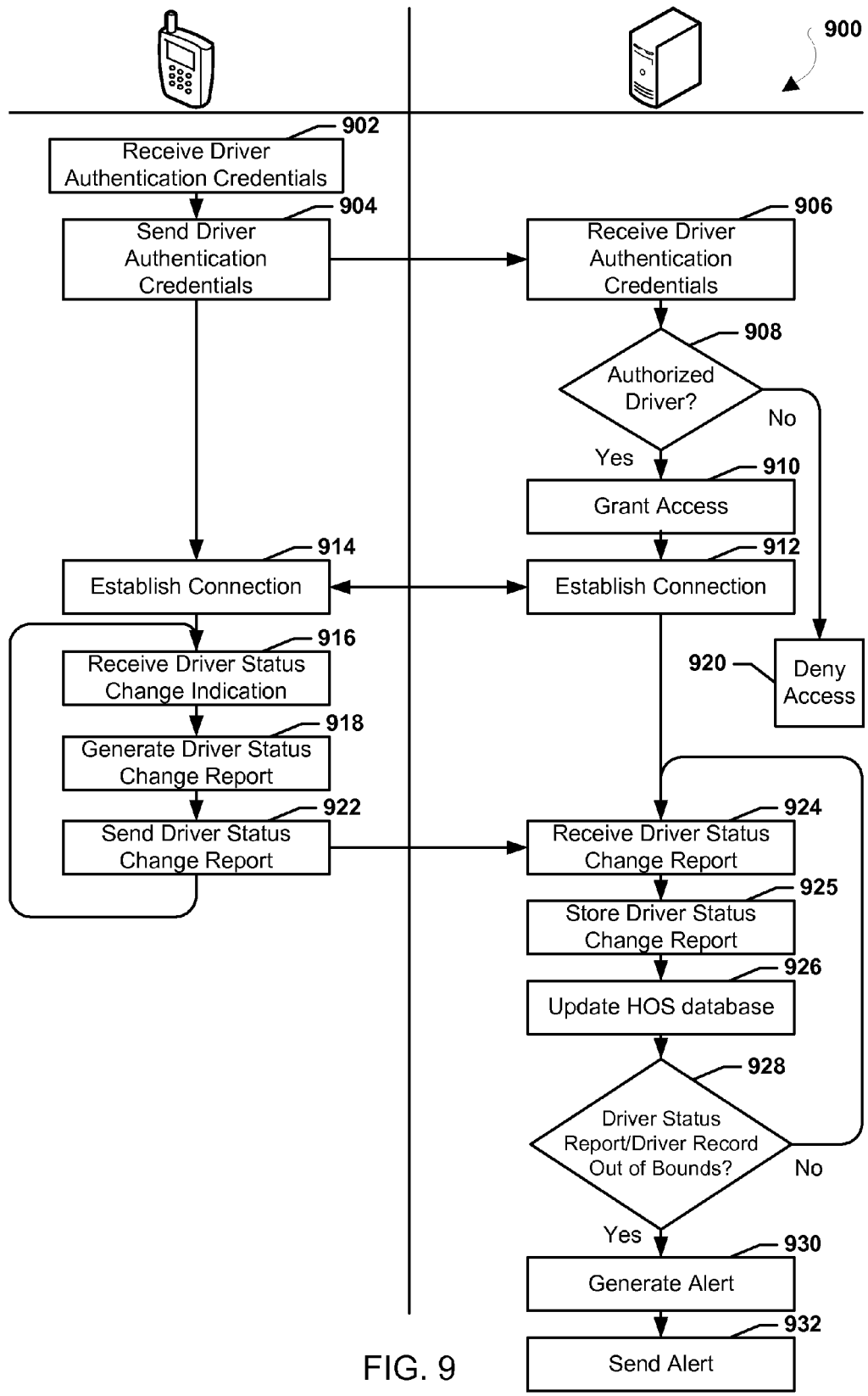
FIG. 9 is a process flow diagram illustrating an embodiment method for updating an HOS database with driver status information.

FIG. 9 illustrates an embodiment method 900 for updating an HOS database with driver status information. In an embodiment, the operations of method 900 may be performed by the processor of driver's mobile device running a web browser, such as a smartphone, and the processor of a server, such as a host server hosting HOS web pages and running an HOS application to maintain an HOS database. In block 902 the driver's mobile device processor may receive drive authentication credentials. In an embodiment, driver authentication credentials may include driver identifying information, such as a driver identifier (ID), license number, name, etc., and/or a driver authentication code, which may be security information uniquely identifying the driver, such as a password, a digital signature, smart card information received from a smart card reader, biometric data received from biometric sensor, etc. The driver authentication credentials may also include a vehicle identifier, which may like a driver to a particular vehicle. In block 904 the driver's mobile device processor may send the driver authentication credentials to the host server. In an embodiment, the driver authentication credentials may be sent to the host server as a message, such as an email, text, web form entry, etc.

In block 906 the host server processor may receive the driver authentication credentials. In determination block 908 the host server processor may determine whether the driver is authorized to access the host server. In an embodiment, the host server processor may determine whether the driver is authorized based on a comparison of the received driver authentication credentials to an authorized user and/or security list/database. For example, the server may compare the received one or more of a vehicle identifier, a driver identifier and a driver authentication code to data stored in the server. This process may also include comparing a reported odometer to the odometer reading last received by the host server from the vehicle's computing device, since this number may help to link a particular driver to a particular vehicle (e.g., a vehicle the driver is authorized to operate). If the driver is not authorized (i.e., determination block 908="No"), in block 920 the host server processor may deny access to the driver. If the driver is authorized (i.e., determination block 908="Yes"), in block 910 the host server processor may grant access to the driver, and at blocks 912 and 914 the driver's mobile device processor and host server processor may establish a connection with each other. In an embodiment, the connection may be established via the host server processor providing web page information, such as web forms for driver status entries, to the driver's mobile device processor for rendering by the driver's mobile device web browser.

In block 916 the driver's mobile device may receive a driver status change indication. In an embodiment, the driver status change indication may be an indication that a driver status has changed, such as a selection on a drop down menu in a web form. As an example, a driver transitioning from "sleeper berth" to "driving", may select "driving" in a drop down menu of a web form. In a further embodiment, a driver status change indication may be an indication received from a sensor of the driver's mobile device, such as a GPS receiver, accelerometer, Bluetooth receiver, etc. As an example, a Bluetooth receiver may indicate a new Bluetooth connection with a new vehicle is established which may indicate a status change. In block 918 the driver's mobile device processor may generate the driver status change report. In an embodiment, the driver status change report may be a message, such as email, text message, or command, generated upon completion of filing out a web form related to driver status including information related to the driver's change of status. In block 922 the driver's mobile device processor may send the driver status change report to the host server and the method 900 may return to block 916. In this manner, the driver's mobile device processor may continually receive status change indications and generate driver status change reports to be sent to the host server.

In block 924 the host server processor may receive the driver status change report. In block 925 the host server processor may store the driver status change report in a memory available to the host server. In block 926 the host server processor may update the HOS database. In an embodiment, the host server processor may update the HOS database by adding additional records and/or overwriting records associated with the vehicle and/or driver associated with the driver status change report. In this manner, a current status of the driver may be maintained and made available at the host server.

In determination block 928 the host server processor may determine whether the driver status change report and/or the driver record associated with the driver is out of bounds. In an embodiment, a driver status change report may be out of bounds if information included in the driver status change report and/or driver record is above, below, and/or equal to a threshold value. As an example, a fleet operator may set a maximum driving time per day for a driver of eight hours, and a driver status change report indicating a driver has exceed the eight hour limit may be out of bounds. As another example, a maximum weekly driving time may be set for each driver, and a driver status change report indicating the driver's weekly driving time may be within five percent of the maximum weekly driving time may be out of bounds. In a further embodiment, out of bounds threshold values may be defined based on various considerations, such as regulations, driver settings, fleet settings, contract requirements, etc. If the driver status change report and/or the driver record is not out of bounds (i.e., determination block 928="No"), the host server processor may return to block 924 to perform operations to receive further driver status change reports.

If the driver status change report and/or the driver record is determined to be out of bounds (i.e., determination block 928="Yes"), in block 930 the host server processor may generate an alert. In an embodiment, an alert may be a message indicating the value that is out of bounds. In an embodiment, an alert may be an email, text message, automated phone call, web browser pop-up, executable code segment, etc. In an embodiment, the alert may include information such as the value that is out of bounds, the amount it is out of bounds, a vehicle ID, driver ID or other information. In block 932 the host server processor may send the alert to the onboard vehicle recorded device and/or the driver's mobile device(s). In a further embodiment, the alert may be sent to a vehicle fleet operator, a vehicle driver, law enforcement, or any combination of parties and/or devices.

Figure 10:
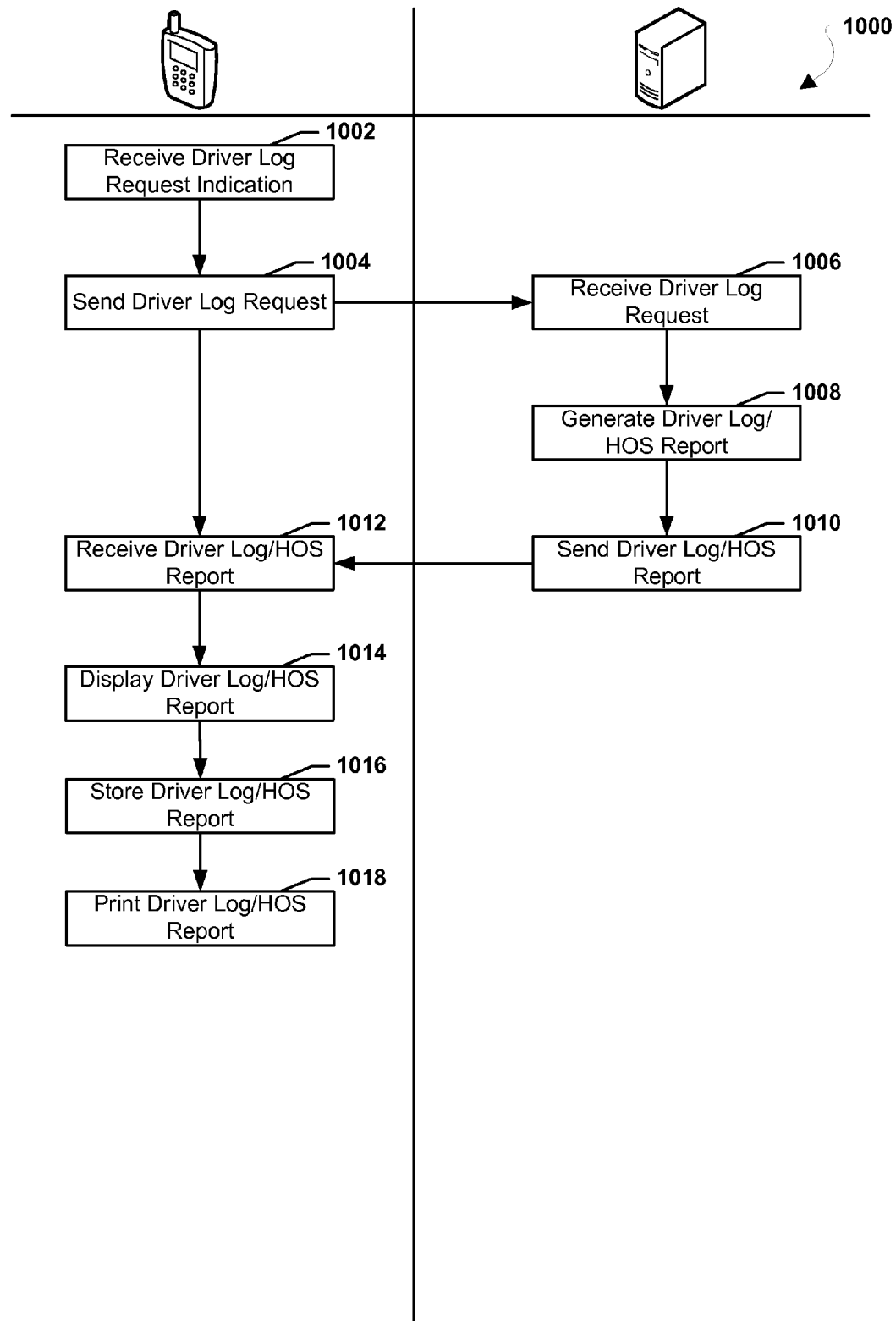
FIG. 10 is a process flow diagram illustrating an embodiment method for generating a driver log.

FIG. 10 illustrates an embodiment method 1000 for generating a driver log and/or HOS report. In an embodiment, the operations of method 1000 may be performed by the processor of driver's mobile device running a web browser, such as a smartphone, and the processor of a server, such as a host server hosting HOS web pages and running an HOS application to maintain an HOS database. In block 1002 the driver's mobile device may receive a driver log request indication. In an embodiment, a driver log request indication may be received from a driver requesting their individual log and/or an HOS report. In a further embodiment, the driver log request may indicate selected parameters governing the desired scope of the driver log, such as the period of time, specific vehicle, driver, etc. In a further embodiment, the driver log request may indicate a specific standard HOS report requested by the driver. In block 1004 the driver's mobile device processor may send a driver log request to the host server. In an embodiment, the driver log request may be a message, such as an email, text, and/or command sent from the web browser of the driver's mobile device. In block 1006 the host server processor may receive the driver log request. In block 1008 the host server processor may generate the requested driver log and/or HOS report, and in block 1010 the host server processor may send the driver log and/or HOS report to the driver's mobile device. In an embodiment, the driver log and/or HOS report may be sent to the driver's mobile device as a web page for rendering by the web browser running on driver's mobile device processor.

In block 1012 the driver's mobile device processor may receive the driver log and/or HOS report, and in block 1014 the driver's mobile device processor may display the driver log and/or HOS report. In an embodiment, the driver's mobile device may display the driver log and/or HOS report by rendering the web page received from the host server. In block 1016 the driver's mobile device processor may store the driver log and/or HOS report. In an embodiment, the driver's mobile device processor may store the driver log and/or HOS report in a memory of the driver's mobile device. In block 1018 the driver's mobile device processor may print the driver log and/or HOS report. In an embodiment, the driver's mobile device may print to a printer associated with the driver's mobile device and/or generate a message, such as an email, including the driver log and/or HOS report to be sent to an account associated with the driver.

Figure 11:
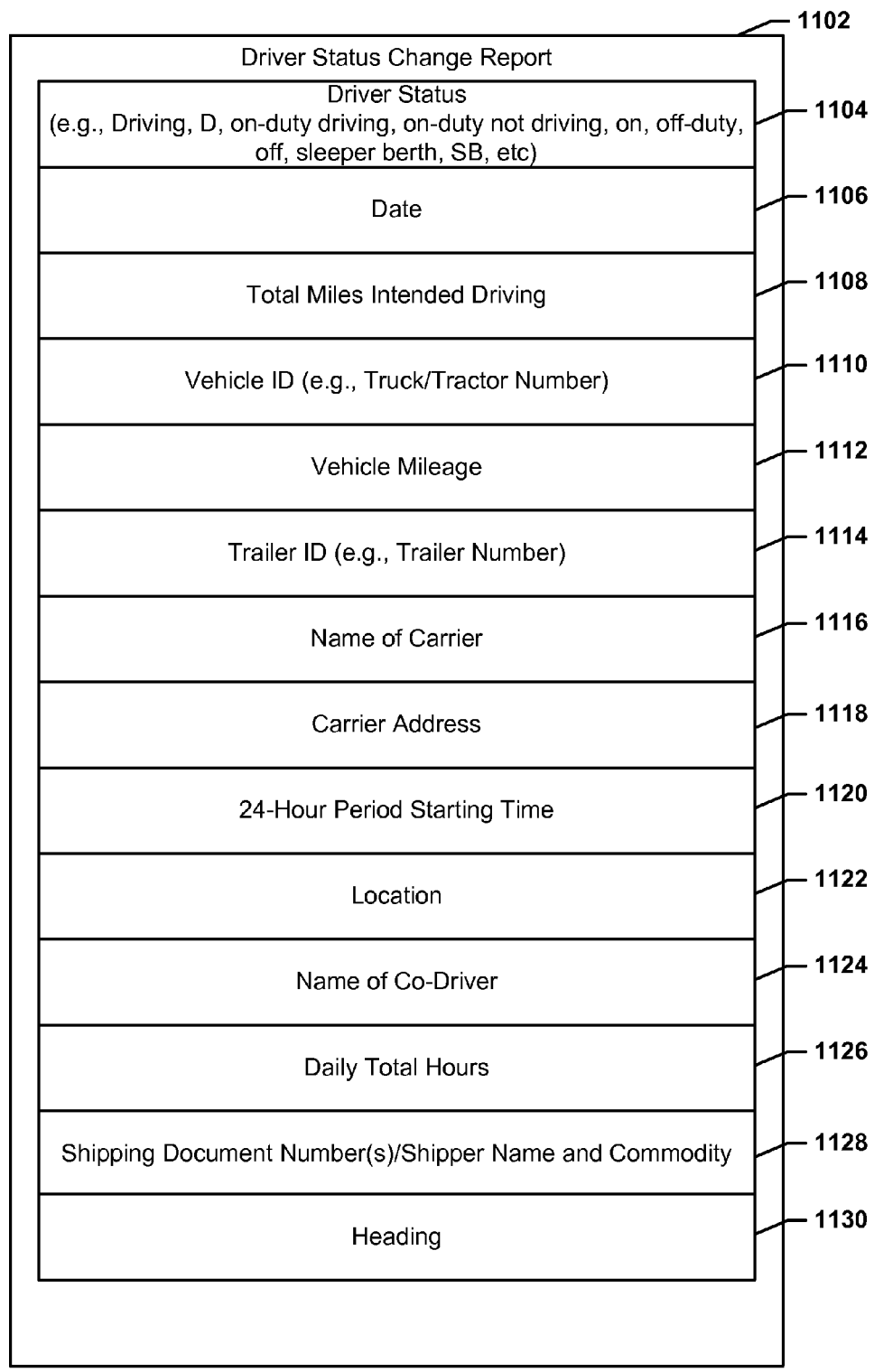
FIG. 11 is a data structure diagram illustrating potential elements of a driver status change report.

FIG. 11 illustrates an embodiment driver status change report 1102. In an embodiment, the driver status change report 1102 may include a driver status indication 1104. In an embodiment, a driver status indication 1104 may include "Driving", "D", "on-duty driving", "on-duty not driving", "on", "off-duty", "off", "sleeper berth", "SB", or any other indication of the driver's status. In an embodiment, the driver status change report 1102 may include the date 1106. In an embodiment, the driver status change report 1102 may include the total miles intended driving 1108. In an embodiment, the driver status change report 1102 may include the vehicle ID 1110. As an example, the vehicle ID may include the truck and/or tractor numbers, such as license plate number, DOT number, and/or registration number. In an embodiment, the driver status change report 1102 may include vehicle mileage 1112. In an embodiment, the driver status change report 1102 may include the trailer ID 1114. As an example, the trailer ID 1114 may include the trailer's license plate number, DOT number, and/or shipping container number. In an embodiment, the driver status change report 1102 may include the name of the carrier 1116, the carrier's address 1118, and the carrier's 24 hour period starting time 1120.

In an embodiment, the driver status change report 1102 may include location information 1122. In an embodiment, location information 1122 may be GPS location information received from a GPS receiver of the driver's mobile device and may include location information identifying that a state line has been crossed. In a further embodiment, location information 1122 may be place names and/or state line crossing indications input by the driver. In an embodiment, the driver status change report 1102 may include the name of a co-driver 1124. In an embodiment, the driver status change report 1102 may include the driver's daily total hours 1126. In an embodiment, the driver status change report 1102 may include shipping document number(s), shipper name, and/or commodity information 1128. In an embodiment, the driver status change report 1102 may include a heading indication 1130. In an embodiment, multiple consecutive location indications may be used by the driver's mobile device processor to extrapolate a likely heading 1130, such as "North" or "North West." In another embodiment, a heading 1130 may be determined by a compass installed in the driver's mobile device.

Figure 12:
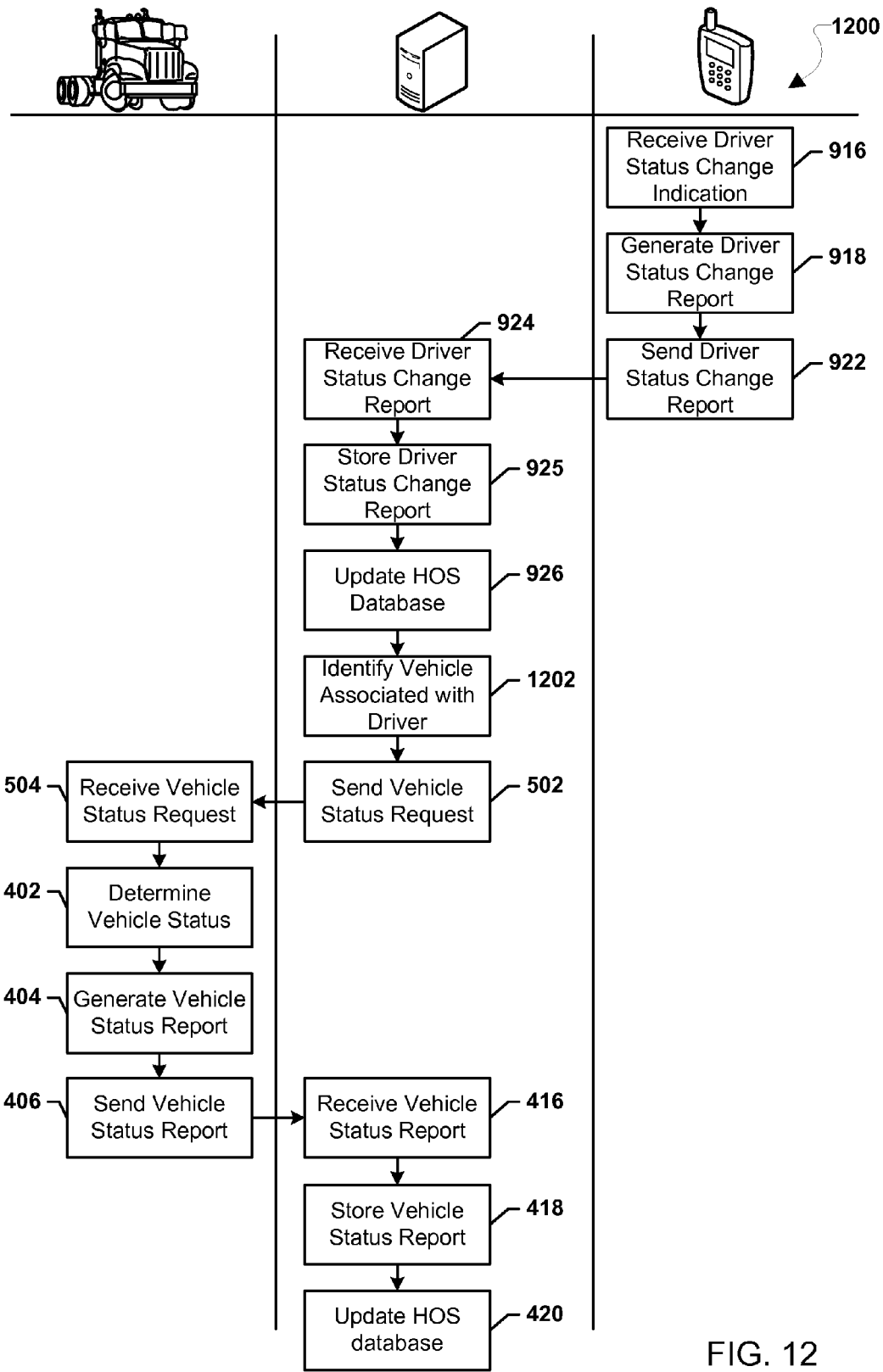
FIG. 12 is a process flow diagram illustrating an embodiment method for updating an HOS database with driver status information and vehicle status information.

FIG. 12 illustrates an embodiment method 1200 for updating an HOS database with driver status information and vehicle status information. In an embodiment, the operations of method 1200 may be performed by the processor of a driver's mobile device running a web browser, such as a smartphone, the processor of a server, such as a host server hosting HOS web pages and running an HOS application to maintain an HOS database, and the processor of an onboard vehicle recording device. In blocks 916, 918, and 922 the driver's mobile device may perform operations of like numbered blocks of method 900 described above with reference to FIG. 9 to generate and send a driver status change report to the host server. In blocks 924, 925, and 926 the host server processor may perform operation of like numbered blocks of method 900 described above with reference to FIG. 9 to receive the driver status change report and update the HOS database. In block 1202 the host server may identify the vehicle associated with the driver associated with the received driver status change report.

As described above, in block 502 the host server processor may send a vehicle status request to the onboard vehicle recording device, and, as described above, in block 504 the onboard vehicle recording device processor may receive the vehicle status request. In an embodiment, the vehicle status request may be sent in response to the received driver status change report to the vehicle associated with the driver associated with the received driver status change report. In blocks 402, 404, and 406 the onboard vehicle recording device processor may perform operations of like numbered blocks of method 400 described above with reference to FIG. 4 to generate and send a vehicle status report. In blocks 416, 418, and 420, the host server processor may perform operations of like numbered blocks of method 400 described above with reference to FIG. 4 to receive the vehicle report and update the HOS database.

Figure 13:
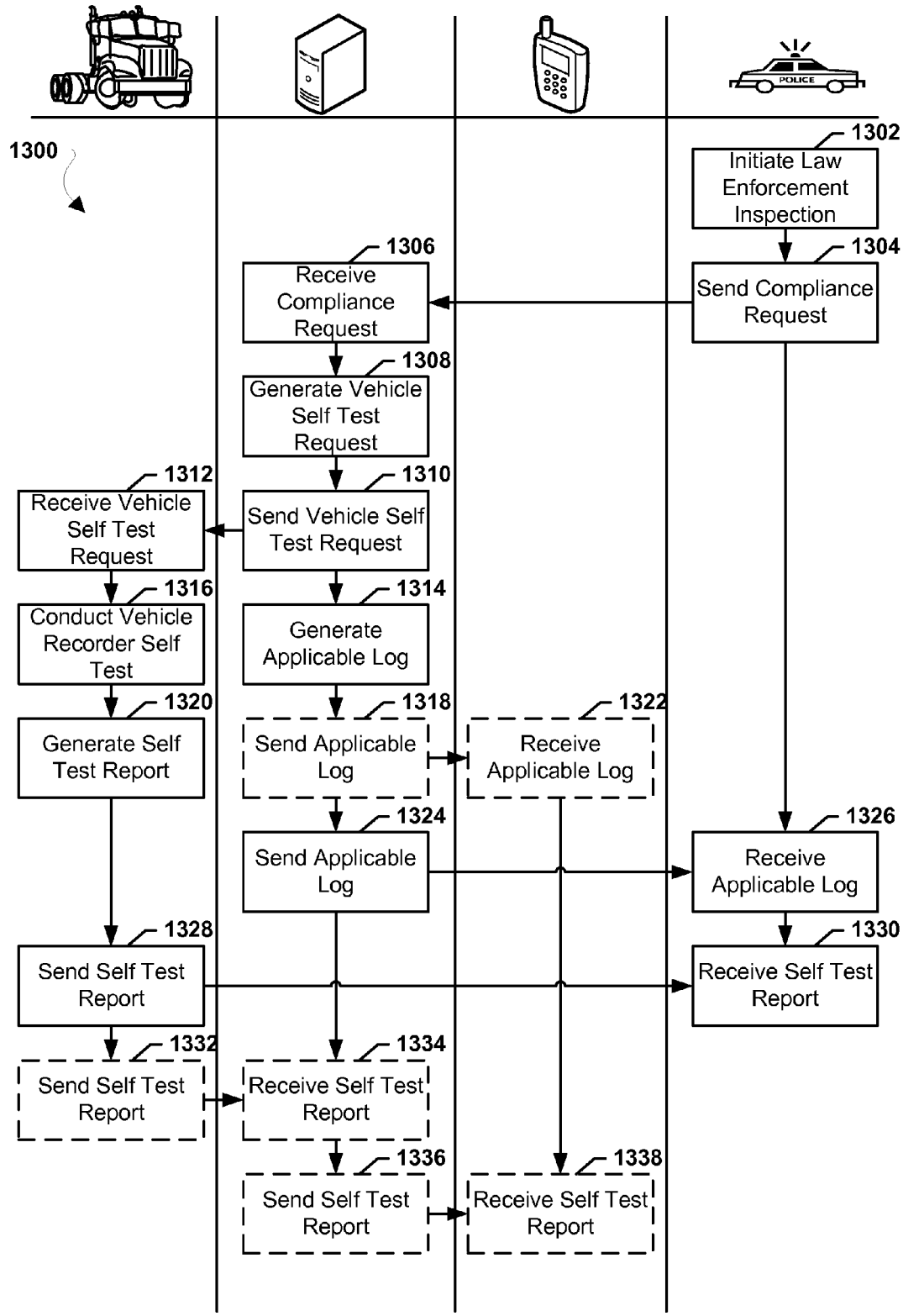
FIG. 13 is a process flow diagram illustrating an embodiment method for responding to a law enforcement initiated HOS system inspection.

FIG. 13 illustrates an embodiment method 1300 for responding to a law enforcement initiated HOS system inspection. In an embodiment, the operations of method 1300 may be performed by the processor of a driver's mobile device running a web browser, such as a smartphone, the processor of a server, such as a host server hosting HOS web pages and running an HOS application to maintain an HOS database, the processor of an onboard vehicle recording device, and the processor of a law enforcement device, such as a web enabled law enforcement vehicle, roadside inspection point and/or scale house. In block 1302 the law enforcement device processor 1302 may initiate a law enforcement inspection. In an embodiment, a law enforcement inspection may be initiated by a law enforcement officer utilizing a web browser of the law enforcement device to access the host server via the Internet, such as during a roadside vehicle inspection. In block 1304 the law enforcement device may send a compliance request to the host server. In an embodiment, the compliance request may be a message from the law enforcement device such as an HTTP communication, an email, a text message, a web form, and/or other command. In an embodiment, the compliance request may identify a specific driver and/or vehicle, such as a driver and vehicle stopped at a scale house. In block 1306 the host server processor may receive the compliance request. In block 1308 the host server may generate a vehicle self test request. In an embodiment, a vehicle self test request may be a message including an indication that the onboard vehicle recording device should test one or more of the various sensors and/or the vehicle recorder itself. In block 1310 the host server may send the vehicle self test request to the onboard vehicle recording device.

In block 1312 the onboard vehicle recording device processor may receive the vehicle self test request. In block 1316 the onboard vehicle recording device may conduct an onboard vehicle recorder self test. In an embodiment, the vehicle recorder self test may include testing one or more of the various sensors and/or the vehicle recorder itself. In block 1320 the onboard vehicle recorder processor may generate a self test report. In an embodiment, a self test report may be an indication that the results of the vehicle recorder self test were or were not acceptable. In another embodiment, the self test report may include information specific to the results of each sensor test. In block 1328 the onboard vehicle recorder processor may send the self test report to the law enforcement device. In block 1330 the law enforcement device may receive the self test report. In this manner, law enforcement personnel may be able to check the onboard vehicle recording device for successful operation.

In an optional embodiment, in optional block 1332 the onboard vehicle recorder processor may send the self test report to the host server. In an optional embodiment, in optional block 1334 the host server processor may receive the self test report, and in optional block 1336 the host server processor may send the self test report to the driver's mobile device. In optional block 1338 the driver's mobile device may receive the self test report. In an embodiment, the self test report may be sent from the various devices as a message, such as an email, text, web page, command, etc.

In parallel to the operations of the onboard vehicle recording device to conduct a vehicle recorder self test, in block 1314 the host server processor may generate an applicable vehicle and/or driver log. In an embodiment, an applicable log may be a log associated with the driver and/or vehicle identified in the compliance request, such as a weekly driving log. In an optional embodiment, in optional block 1318 the host server processor may send the applicable log to the driver's mobile device and in optional block 1322 the driver's mobile device processor may receive the applicable log.

In block 1324 the host server processor may send the applicable log to the law enforcement device, and in block 1326 the law enforcement device may receive the applicable log. In an embodiment, the applicable log may be sent as a message, such as an email, a text message, a web page, a spreadsheet, a PDF report, etc. In this manner, law enforcement personnel may be able to review the current logs for a driver and/or vehicle independent of the driver and/or vehicle which may reduce the ability to tamper with onboard logs.

Figure 14:
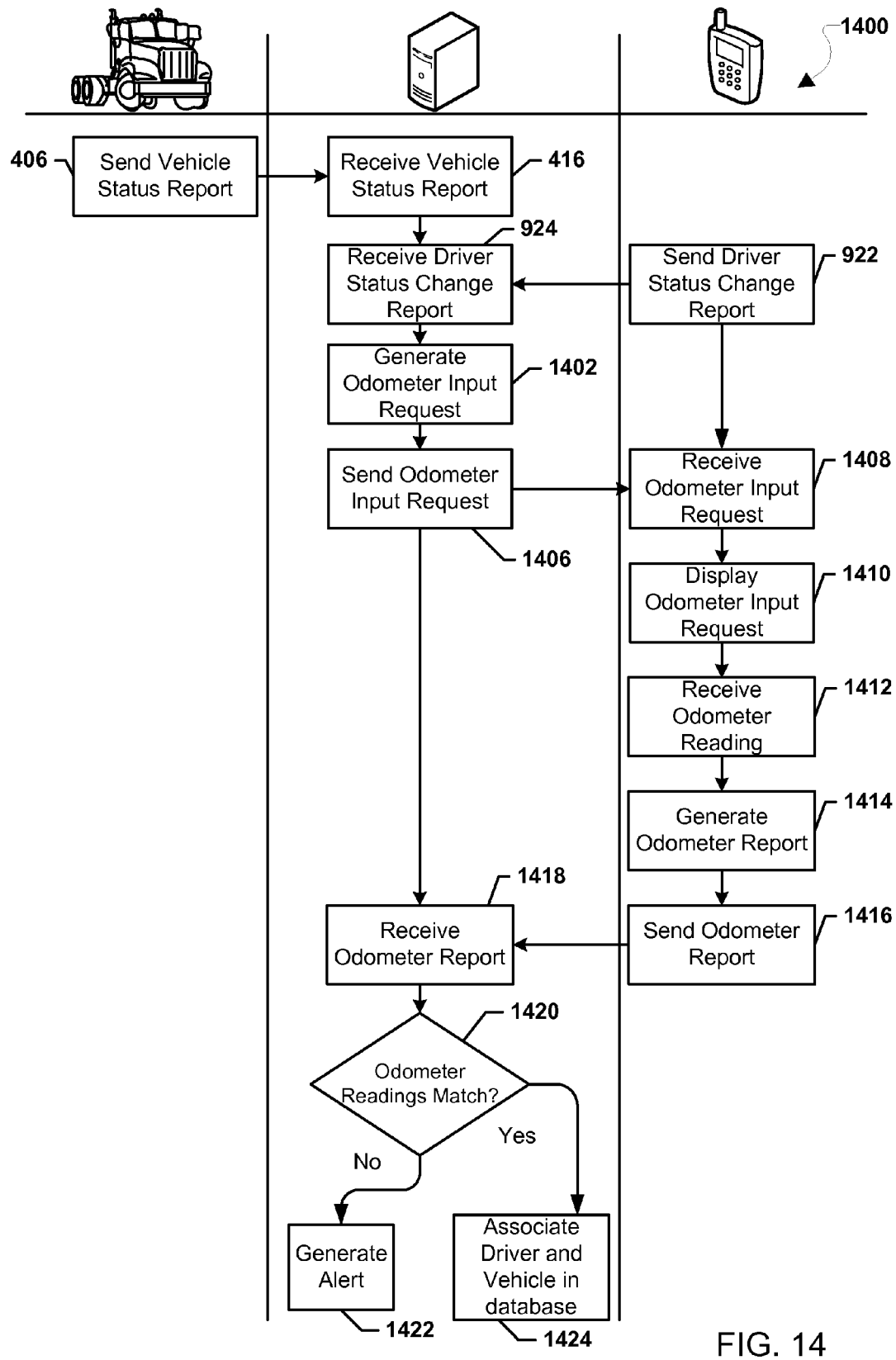
FIG. 14 is a process flow diagram illustrating an embodiment method for associating a driver and a vehicle based an odometer reading.

FIG. 14 illustrates an embodiment method 1400 for associating a driver and a vehicle based an odometer reading. In an embodiment, the operations of method 1400 may be performed by the processor of a driver's mobile device running a web browser, such as a smartphone, the processor of a server, such as a host server hosting HOS web pages and running an HOS application to maintain an HOS database, and the processor of an onboard vehicle recording device. As discussed above, in block 406 the onboard vehicle recording device may send a vehicle status report to the host server. In an embodiment, the vehicle status report may include a vehicle ID and/or an odometer reading. In a further embodiment, the vehicle status report may include vehicle performance data such as one or more of speed, engine revolutions per minute, mileage, vehicle ID, trailer ID, fuel level, vehicle weight, engine operation time, GPS location, and acceleration in addition to the odometer reading. As discussed above, in block 416 the host server processor may receive the vehicle status report. As discussed above, in block 922 the driver's mobile device processor may send a driver status change report to the host server. In an embodiment, the driver status change report may include an indication that the driver is starting duty. As discussed above, in block 924 the host server may receive the driver status change report. In response to receiving the driver status change report, in block 1402 the host server may generate an odometer input request. In an embodiment, an odometer input request may be a popup menu or other user interface display on the driver device to prompt the driver to enter the vehicle's odometer reading. In an embodiment, the odometer input request may be a message, such as an email, text message, web form, etc. In block 1406 the host server may send the odometer input request to the driver's mobile device.

In block 1408 the driver's mobile device processor may receive the odometer input request. In block 1410 the driver's mobile device processor may display the odometer input request. In an embodiment, the driver's mobile device may display the odometer input request as a pop-up window in the driver's mobile device web browser, such as a pop-up web form. In block 1412 the driver's mobile device processor may receive the odometer reading. In an embodiment, the driver may use a key pad or touch screen of the driver's mobile device to enter the vehicle displayed odometer reading. In an embodiment, the driver may further enter his or her driver ID, the vehicle ID, and/or other information in addition to the vehicle displayed odometer reading. In block 1414 the driver's mobile device processor may generate an odometer report. In an embodiment, the odometer report may include the vehicle displayed odometer reading as well as other information such as the driver ID and/or vehicle ID. In block 1416 the driver's mobile device processor may send the odometer report to the host server. In an embodiment, the odometer report may be sent as a message, such as an email, text message, web form, command, etc.

In block 1418 the host server processor may receive the odometer report. In determination block 1420 the host server processor may determine whether the vehicle displayed odometer reading in the odometer report corresponds to the odometer reading included in the vehicle performance data. If the odometer reading match (i.e., determination block 1420="Yes"), in block 1424 the host server processor may associate the driver and vehicle in a database. In an embodiment, the host server processor may associate the driver and vehicle in a fleet management database, such as an HOS database. If the odometer readings do not match (i.e., determination block 1420="No"), in block 1422 the host server may generate an alert. In an embodiment, an alert may be a message indicating the driver's odometer entry and the vehicle odometer do not match. In an embodiment, an alert may be an email, text message, automated phone call, web browser pop-up, executable code segment, etc. In an embodiment, the alert may be sent to a dispatcher and/or the driver's mobile device.

Figure 15:
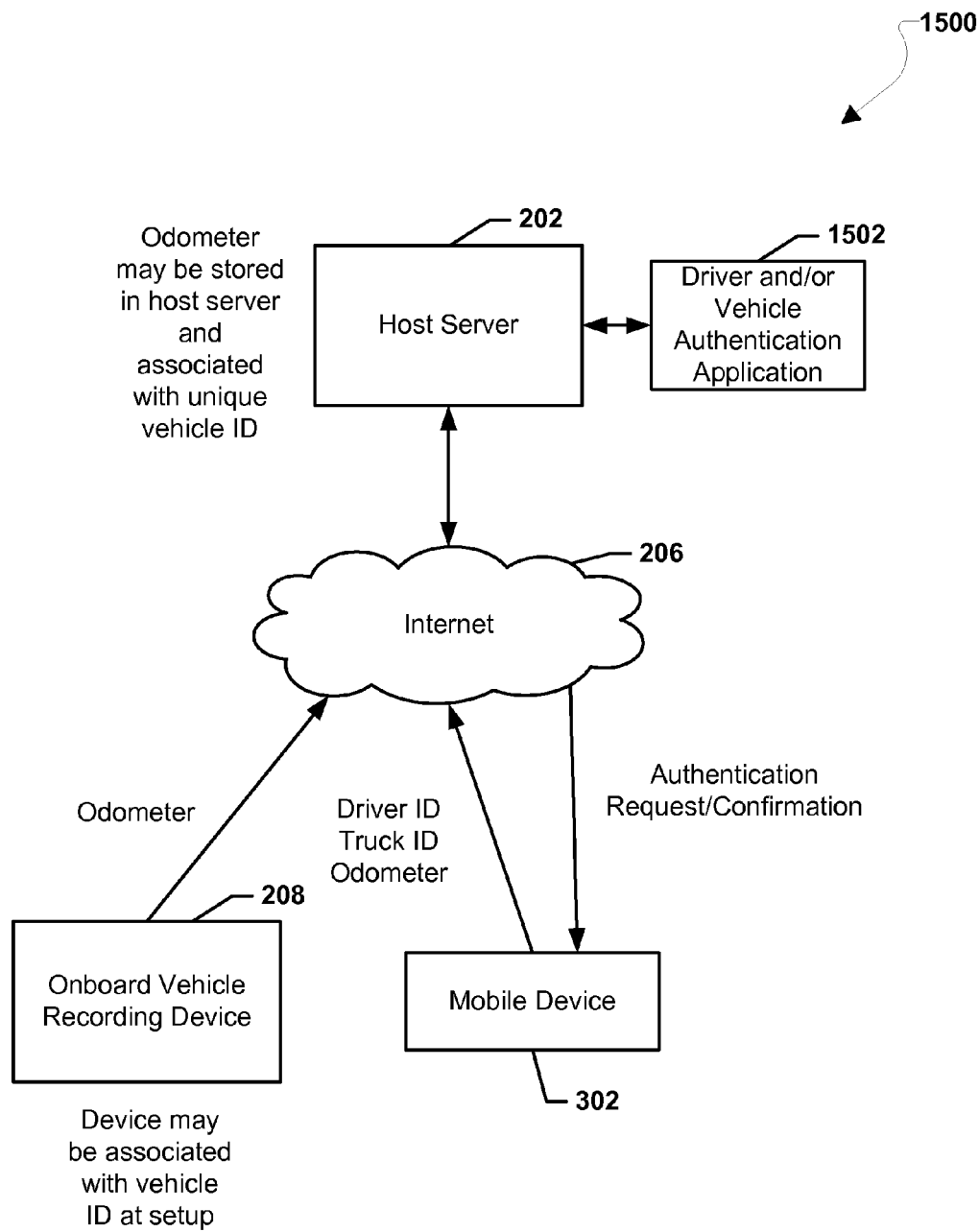
FIG. 15 is a system block diagram of a third HOS system according to an embodiment.

FIG. 15 illustrates an embodiment HOS system 1500 suitable for use with the various embodiments. HOS system 1500 differs from the HOS system 300 described above with reference to FIG. 3, in that in HOS system 1502 the host server 202 may also run a driver and/or vehicle authentication application 1502. In an embodiment, the onboard vehicle recording device 208 may be associated with the vehicle ID at initial setup of the onboard vehicle recording device 208. The onboard vehicle recording device 208 may send the odometer reading to the host server 202 via the Internet 206. In an embodiment, the host server 202 may store the odometer reading received from the onboard vehicle recording device 208 and may associate the odometer reading with a unique vehicle ID. In an embodiment, the host server 202 may send an authentication request to the mobile device 302 via the Internet 206. In an embodiment, the mobile device 302 may send the driver ID, truck ID, and/or odometer reading entered by the driver to the host server 202 via the Internet 206. In an embodiment, if the received odometer reading and/or truck ID match the odometer reading stored at the host server 202, the host server 202 may authenticate the driver and associate the driver with the unique vehicle ID. In an embodiment, the host server 202 may send an authentication confirmation to the mobile device 302.

Figure 16:
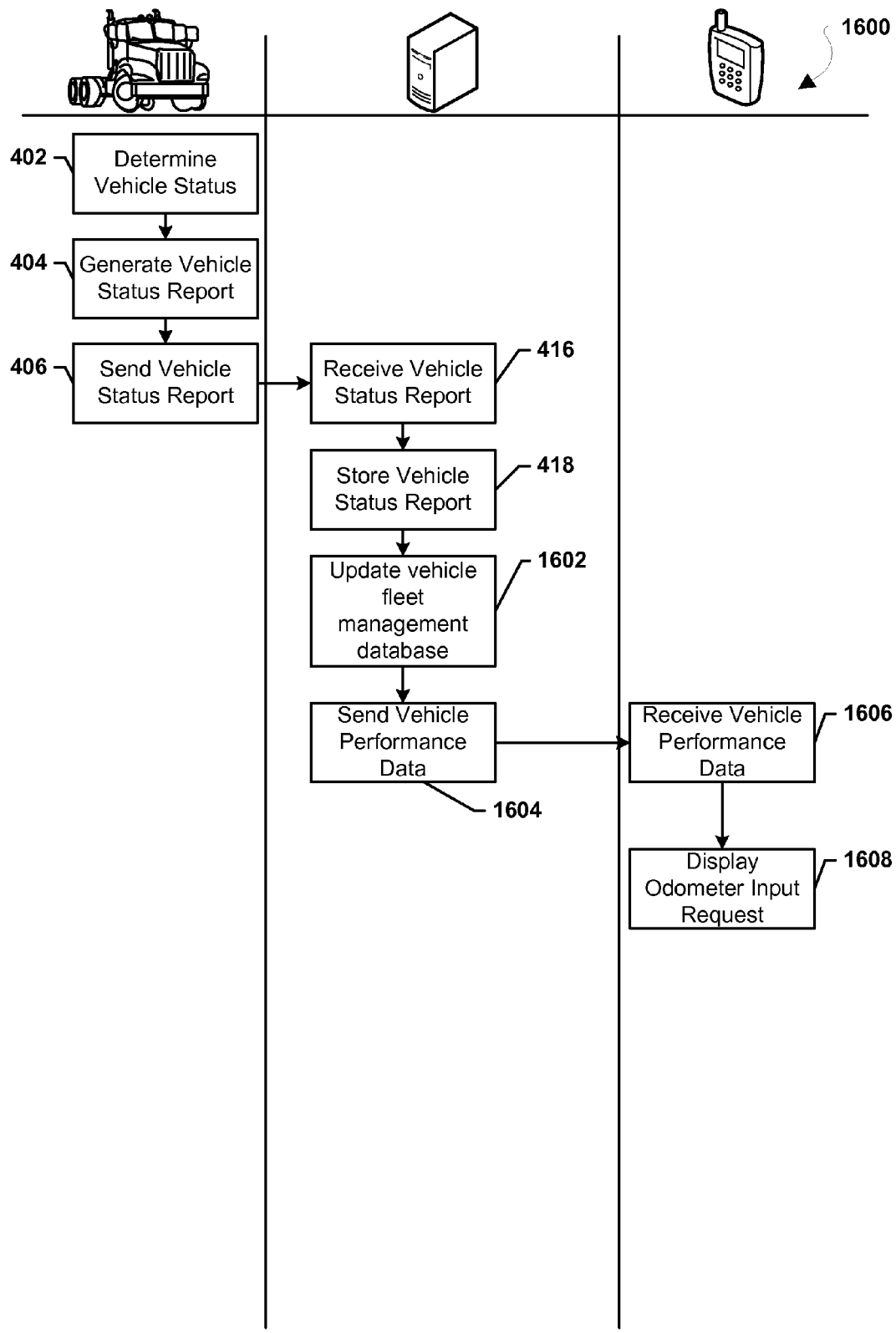
FIG. 16 is a process flow diagram illustrating an embodiment method for displaying vehicle performance data on a driver's device.

FIG. 16 illustrates an embodiment method 1600 for displaying vehicle performance data on a driver's device. In an embodiment, the operations of method 1600 may be performed by the processor of a driver's mobile device running a web browser, such as a smartphone, the processor of a server, such as a host server hosting HOS web pages and running an HOS application to maintain an HOS database, and the processor of an onboard vehicle recording device. In blocks 402, 404, and 406 the onboard vehicle recording device processor may perform operations of like numbered blocks of method 400 described above with reference to FIG. 4 to generate and send a vehicle status report. In an embodiment, the vehicle status report may include vehicle performance data including, for example, one or more of speed, engine revolutions per minute, mileage, vehicle ID, trailer ID, fuel level, vehicle weight, engine operation time, GPS location, and acceleration. In blocks 416 and 418, the host server processor may perform operations of like numbered blocks of method 400 described above with reference to FIG. 4 to receive and store the vehicle report.

In block 1602 the host server may update a vehicle fleet management database. The vehicle fleet management database may be one or more of a vehicle and/or trailer type database, an hours-of-service database, a workflow database, a proof-of-delivery database, and a driver feedback database, for example. In an embodiment, the host server processor may update the vehicle fleet management database by adding additional records and/or overwriting records associated with the vehicle and/or driver associated with the vehicle. In this manner, a current status of the vehicle may be maintained and made available at the host server. In an embodiment, the vehicle fleet management database may be any type vehicle/driver/shipping management database, such as an HOS database, workflow database, proof-of-delivery database, driver feedback database, etc. In block 1604 the host server processor may send the vehicle performance data received in the vehicle status report to the driver's mobile device. In an embodiment, the vehicle performance data may be sent as a message, such as an email, text message, executable code, web page update, command, etc.

In block 1606 the driver's mobile device processor may receive the vehicle performance data, and in block 1608 the driver's mobile device processor may display the vehicle performance data on a display of the driver's mobile device. In an embodiment, the vehicle performance data may be displayed as part of a dynamic webpage displayed in the web browser of the driver's mobile device. In this manner, the host server may act as a virtual router providing vehicle performance data from the onboard vehicle recording device(s) to the driver's mobile device without the onboard vehicle recording device(s) and the driver's mobile device being in direct communication.

Figure 17:
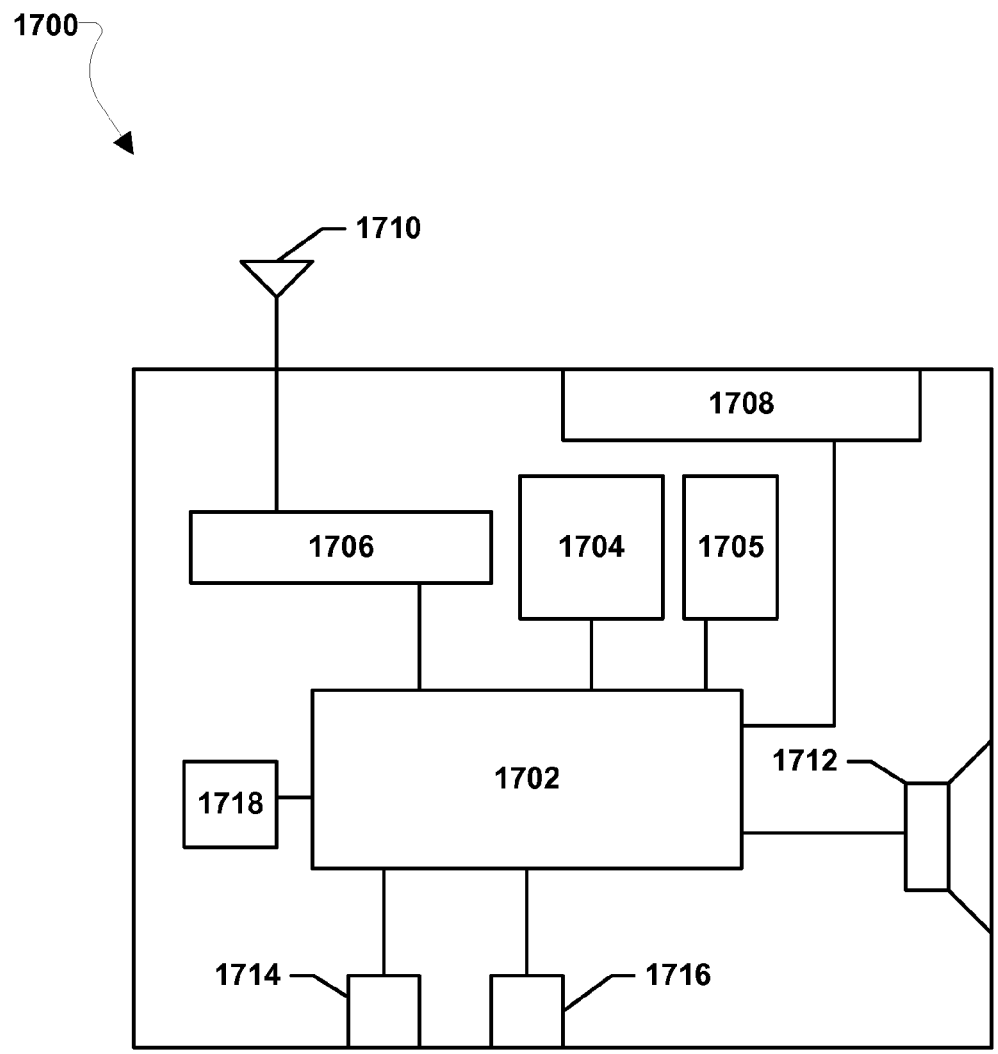
FIG. 17 is a component diagram of an example onboard vehicle recording device suitable for use with the various embodiments.

The various embodiments may be implemented in any of a variety of onboard vehicle recording devices, an example of which is illustrated in FIG. 17. For example, the onboard vehicle recording device 1700 may include a processor 1702 coupled to internal memories 1704 and 1705. Internal memories 1704 and 1705 may be volatile or non-volatile memories, and may also be secure and/or encrypted memories, or unsecure and/or unencrypted memories, or any combination thereof. The processor 1702 may also be coupled to a touch screen display 1708, such as a resistive-sensing touch screen, capacitive-sensing touch screen infrared sensing touch screen, or the like. Additionally, the display of the onboard vehicle recording device 1700 need not have touch screen capability. Additionally, the onboard vehicle recording device 1700 may have one or more antenna 1710 for sending and receiving electromagnetic radiation that may be connected to a wireless data link and/or cellular telephone transceiver 1706 coupled to the processor 1702. The processor 1702 may also be coupled to a speaker 1712 to generate audible sound, such as alerts. The processor 1702 may also be coupled to various sensor input ports 1714 and 1716 for establishing data connections between various vehicle sensors and the processor 1702. While illustrated as two input ports 1714 and 1716, the onboard vehicle recording device 1700 may have more than two sensor input ports. The onboard vehicle recording device 1700 may also include a position sensor 1718, such as a GPS receiver, coupled to the processor 1702.

Figure 18:
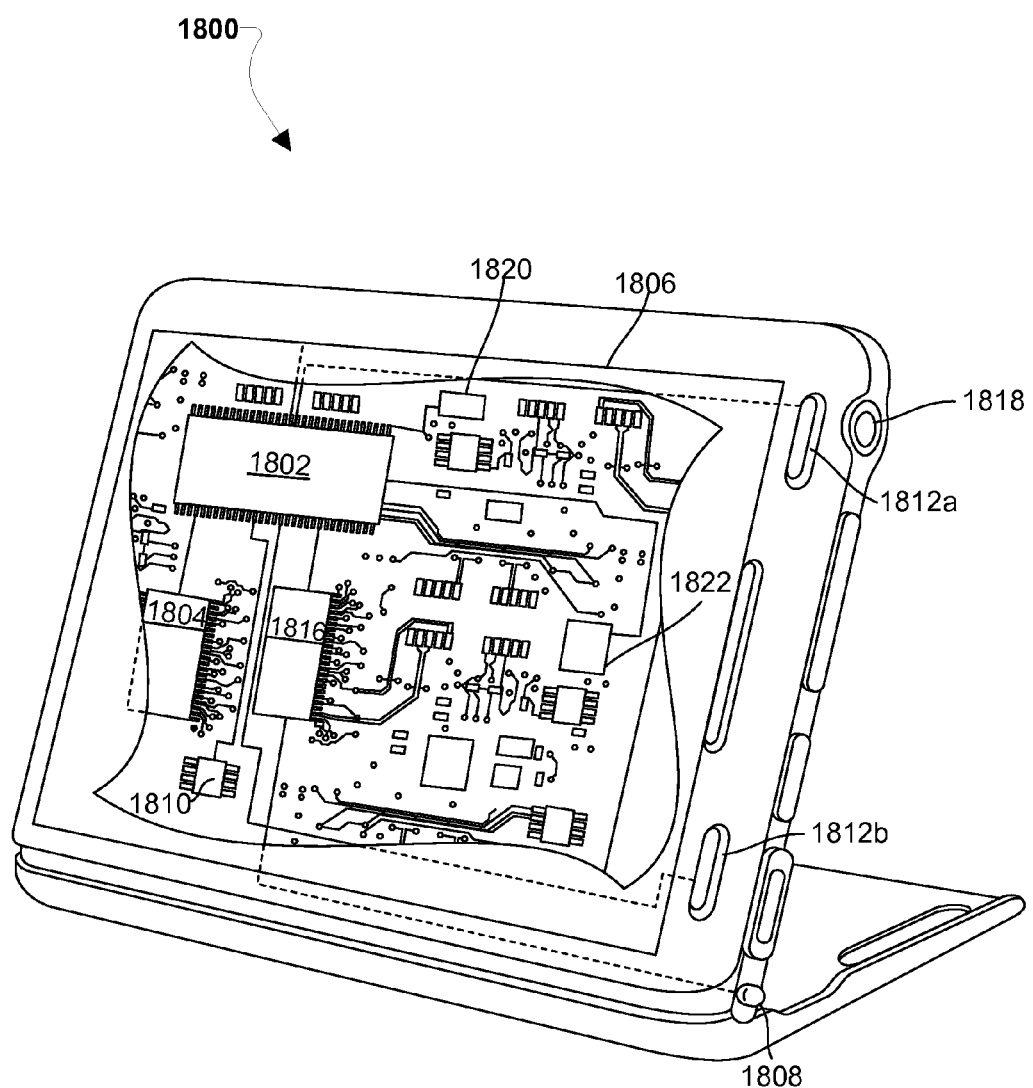
FIG. 18 is a component diagram of an example mobile device suitable for use with the various embodiments.

The various embodiments may be implemented in any of a variety of wireless devices, an example of which is illustrated in FIG. 18. For example, the wireless device 1800 may include a processor 1802 coupled to internal memories 1804 and 1810. Internal memories 1804 and 1810 may be volatile or non-volatile memories, and may also be secure and/or encrypted memories, or unsecure and/or unencrypted memories, or any combination thereof. The processor 1802 may also be coupled to a touch screen display 1806, such as a resistive-sensing touch screen, capacitive-sensing touch screen infrared sensing touch screen, or the like. Additionally, the display of the wireless device 1800 need not have touch screen capability. Additionally, the wireless device 1800 may have one or more antenna 1808 for sending and receiving electromagnetic radiation that may be connected to one or more a wireless data link and/or cellular telephone transceiver 1816 coupled to the processor 1802. The wireless device 1800 may also include physical buttons 1812*a* and 1812*b* for receiving user inputs. The wireless device 1800 may also include a power button 1818 for turning the wireless device 1800 on and off. The wireless device 1800 may also include a battery 1820 coupled to the processor 1802. The wireless device 1800 may also include a position sensor 1822, such as a GPS receiver, coupled to the processor 1802.

Figure 19:
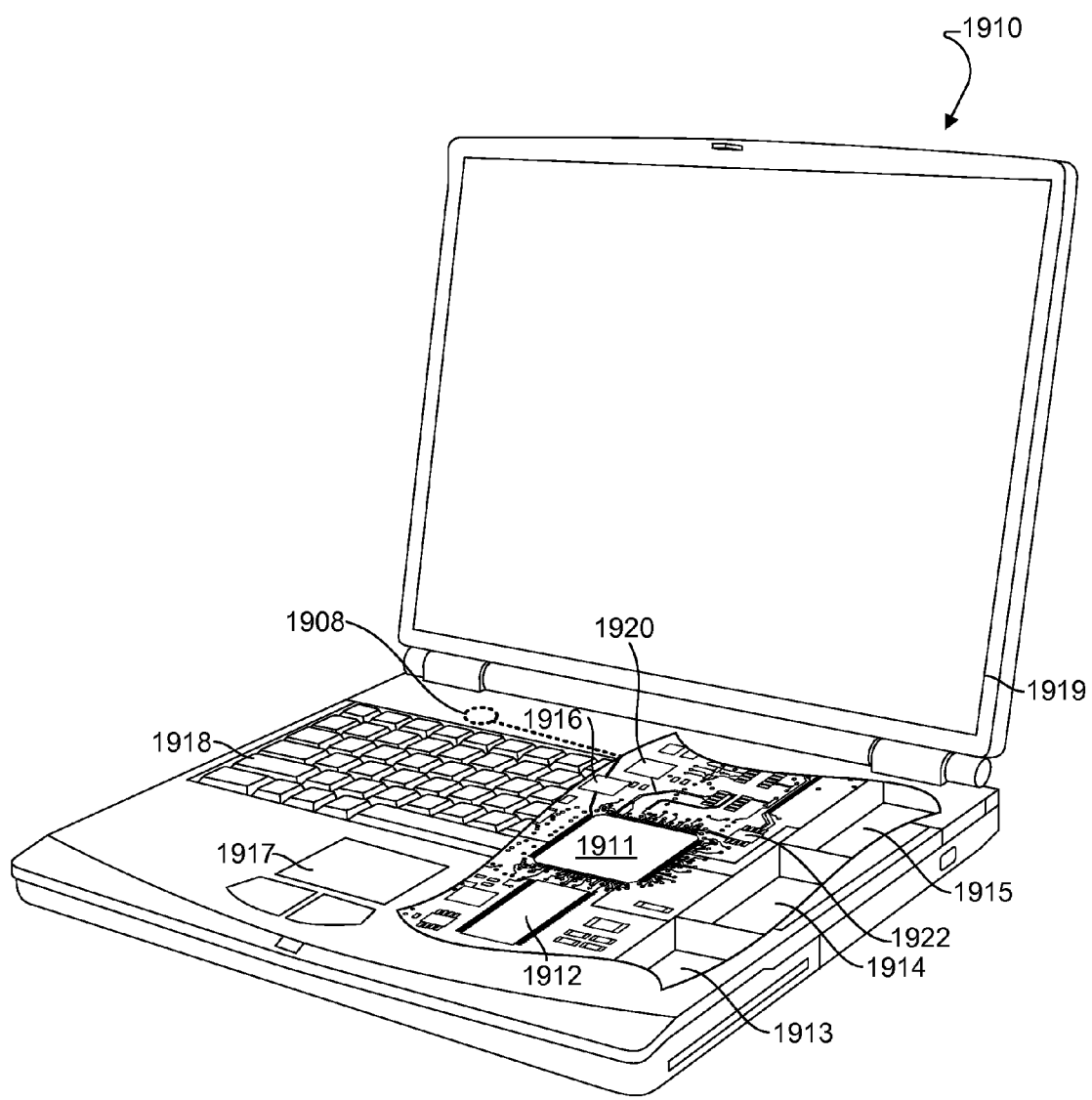
FIG. 19 is a component diagram of another example mobile device suitable for use with the various embodiments.

The various embodiments described above may also be implemented within a variety of personal computing devices, such as a laptop computer 1910 as illustrated in FIG. 19. Many laptop computers include a touch pad touch surface 1917 that serves as the computer's pointing device, and thus may receive drag, scroll, and flick gestures similar to those implemented on mobile computing devices equipped with a touch screen display and described above.

A laptop computer 1910 will typically include a processor 1911 coupled to volatile memory 1912 and a large capacity nonvolatile memory, such as a disk drive 1913 of Flash memory. The laptop computer 1910 may also include a floppy disc drive 1914 and a compact disc (CD) drive 1915 coupled to the processor 1911. The laptop computer 1910 may also include a number of connector ports coupled to the processor 1911 for establishing data connections or receiving external memory devices, such as a USB or FireWire® connector sockets, or other network connection circuits for coupling the processor 1911 to a network. In a notebook configuration, the computer housing includes the touchpad 1917, the keyboard 1918, and the display 1919 all coupled to the processor 1911. The laptop computer 1910 may also include a battery 1920 coupled to the processor 1911. The laptop computer 1910 may also include a position sensor 1922, such as a GPS receiver, coupled to the processor 1911. Additionally, the laptop computer 1910 may have one or more antenna 1908 for sending and receiving electromagnetic radiation that may be connected to one or more a wireless data link and/or cellular telephone transceiver 1916 coupled to the processor 1911. Other configurations of the computing device may include a computer mouse or trackball coupled to the processor (e.g., via a USB input) as are well known, which may also be used in conjunction with the various embodiments.

Figure 20:
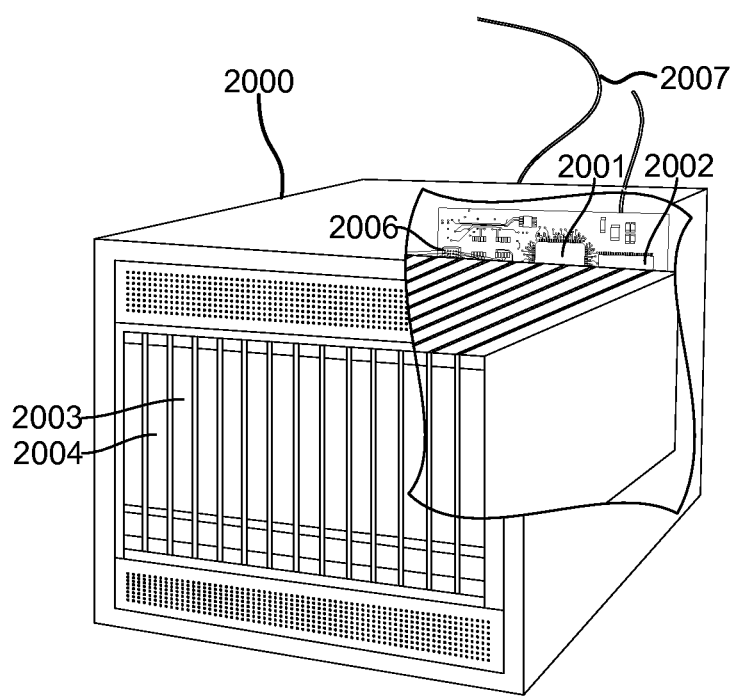
FIG. 20 is a component diagram of an example server suitable for use with the various embodiments

The various embodiments may also be implemented on any of a variety of commercially available server devices, such as the server 1200 illustrated in FIG. 20. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing network interface connections with a communication network 2007, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1702, 1802, 1911, and 2001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1704, 1705, 1804, 1810, 1912, 1913, 2002, and 2003 before they are accessed and loaded into the processors 1702, 1802, 1911, and 2001. The processors 1702, 1802, 1911, and 2001 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1702, 1802, 1911, and 2001 including internal memory or removable memory plugged into the device and memory within the processor 1702, 1802, 1911, and 2001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for off-board hours-of-service ("HOS") processing for a vehicle, comprising:
   receiving, at a host server, vehicle performance data from a vehicle recording device onboard the vehicle, wherein the vehicle recording device does not perform HOS calculations;
   receiving, at the host server, an indication of a driver status change from a driver's mobile device, wherein the driver's mobile device does not perform HOS calculations, and wherein the driver's mobile device and the vehicle recording device independently exchange information with the host server without requiring communication between the driver's mobile device and the vehicle recording device; and
   updating an HOS database based at least in part on the received vehicle performance data and the received indication of the driver status change.

2. The method of claim 1, further comprising:
   generating an HOS report at the host server based at least in part on the updated HOS database; and
   sending the HOS report from the host server to the driver's mobile device without exchanging data with the vehicle recording device.

3. The method of claim 1, further comprising:
   generating a record of duty status report at the host server based at least in part on the updated HOS database; and
   sending the record of duty status report from the host server to the driver's mobile device without exchanging data with the vehicle recording device.

4. The method of claim 1, wherein the indication of a driver status change indicates a change of status to one or more of driving, D, on-duty driving, on-duty not driving, on, off-duty, off, sleeper berth, and SB.

5. The method of claim 1, wherein vehicle performance data includes one or more of speed, engine revolutions per minute, mileage, vehicle ID, trailer ID, fuel level, vehicle weight, engine operation time, GPS location, and acceleration.

6. The method of claim 1, wherein the vehicle performance data includes a vehicle ID and an odometer reading and wherein the indication of the driver status change includes a driver ID, the method further comprising:
   generating an odometer input request at the host server;
   sending the odometer input request to the driver's mobile device;
   receiving, at the host server, an odometer report from the driver's mobile device in response to the odometer input request, wherein the odometer report includes a vehicle displayed odometer reading;
   determining whether the vehicle displayed odometer reading corresponds to the odometer reading included in the vehicle performance data; and
   associating the driver ID with the vehicle ID in the HOS database in response to determining the vehicle displayed odometer reading corresponds to the odometer reading included in the vehicle performance data.

7. The method of claim 1, further comprising:
   receiving, at the host server, an odometer reading from the driver's mobile device, wherein the odometer reading includes a vehicle displayed odometer reading; and
   associating the odometer reading with a vehicle ID in the HOS database.

8. The method of claim 1, wherein the driver's mobile device does not run an HOS application.

9. The method of claim 1, wherein the vehicle performance data includes a vehicle ID and an odometer reading and wherein the indication of the driver status change includes a driver ID.

10. A method for workflow processing for a vehicle, comprising:
    receiving, at a host server, vehicle performance data from a vehicle recording device onboard the vehicle, wherein the vehicle recording device does not perform HOS calculations;
    receiving, at the host server, an indication of a driver status change from a driver's mobile device, wherein the driver's mobile device does not perform HOS calculations, and wherein the driver's mobile device and the vehicle recording device independently exchange information with the host server without requiring communication between the driver's mobile device and the vehicle recording device; and
    updating a vehicle fleet management database based at least in part on the received vehicle performance data and the received indication of the driver status change.

11. The method of claim 10, further comprising:
    providing the vehicle performance data from the host server to the driver's mobile device without exchanging data with the vehicle recording device.

12. The method of claim 11, wherein the vehicle fleet management database is one or more of a type database, an hours-of-service database, a workflow database, a proof-of-delivery database, and a driver feedback database.

13. An off-board hours-of-service ("HOS") system, comprising:
    a host server comprising:
      means for receiving vehicle performance data from a vehicle recording device onboard the vehicle, wherein the vehicle recording device does not perform HOS calculations;
      means for receiving an indication of a driver status change from a driver's mobile device, wherein the driver's mobile device does not perform HOS calculations, and wherein the driver's mobile device and the vehicle recording device independently exchange information with the host server without requiring communication between the driver's mobile device and the vehicle recording device; and
      means for updating an HOS database based at least in part on the received vehicle performance data and the received indication of the driver status change.

14. The system of claim 13, wherein the host server further comprises:
    means for generating an HOS report based at least in part on the updated HOS database; and means for sending the HOS report to the driver's mobile device without exchanging data with the vehicle recording device.

15. The system of claim 13, wherein the host server further comprises:
    means for generating a record of duty status report based at least in part on the updated HOS database; and
    means for sending the record of duty status report to the driver's mobile device without exchanging data with the vehicle recording device.

16. The system of claim 13, wherein the indication of a driver status change indicates a change of status to one or more of driving, D, on-duty driving, on-duty not driving, on, off-duty, off, sleeper berth, and SB.

17. The system of claim 13, wherein vehicle performance data includes one or more of speed, engine revolutions per minute, mileage, vehicle ID, trailer ID, fuel level, vehicle weight, engine operation time, GPS location, and acceleration.

18. The system of claim 13, wherein the vehicle performance data includes a vehicle ID and an odometer reading, wherein the indication of the driver status change includes a driver ID, wherein the host server further comprises:
    means for generating an odometer input request;
    means for sending the odometer input request to the driver's mobile device;
    means for receiving an odometer report from the driver's mobile device in response to the odometer input request, wherein the odometer report includes a vehicle displayed odometer reading;
        means for determining whether the vehicle displayed odometer reading corresponds to the odometer reading included in the vehicle performance data; and
        means for associating the driver ID with the vehicle ID in the HOS database in response to determining the vehicle displayed odometer reading corresponds to the odometer reading included in the vehicle performance data.

19. An off-board hours-of-service ("HOS") system, comprising: a host server, comprising:
    a first transceiver configured to communicate with a communication network; and
    a host server processor coupled to the first transceiver, wherein the host server is remote from the vehicle, and wherein the host server processor is configured with processor-executable instructions to perform operations comprising:
        receiving, via the first transceiver, vehicle performance data from a second transceiver coupled to a vehicle recording device onboard the vehicle, wherein the vehicle recording device does not perform HOS calculations;
        receiving, via the first transceiver, an indication of a driver status change from a third transceiver coupled to a driver's mobile device, wherein the driver's mobile device does not perform HOS calculations, and wherein the driver's mobile device and the vehicle recording device independently exchange information with the host server without requiring communication between the driver's mobile device and the vehicle recording device; and
        updating an HOS database based at least in part on the received vehicle performance data and the received indication of the driver status change.

20. The system of claim 19, wherein the host server is configured with processor-executable instructions to perform operations further comprising:
    generating an HOS report based at least in part on the updated HOS database; and
    sending the HOS report via the first transceiver to the driver's mobile device without exchanging data with the vehicle recording device.

21. The system of claim 19, wherein the host server is configured with processor-executable instructions to perform operations further comprising:
    generating a record of duty status report based at least in part on the updated HOS database; and
    sending the record of duty status report via the first transceiver to the driver's mobile device without exchanging data with the vehicle recording device.

22. The system of claim 19, wherein the indication of a driver status change indicates a change of status to one or more of driving, D, on-duty driving, on-duty not driving, on, off-duty, off, sleeper berth, and SB.

23. The system of claim 19, wherein vehicle performance data includes one or more of speed, engine revolutions per minute, mileage, vehicle ID, trailer ID, fuel level, vehicle weight, engine operation time, GPS location, and acceleration.

24. The system of claim 19, wherein the vehicle performance data includes a vehicle ID and an odometer reading, wherein the indication of the driver status change includes a driver ID, wherein the host server is configured with processor-executable instructions to perform operations further comprising:
    generating an odometer input request; and
    sending the odometer input request via the first transceiver to the driver's mobile device,
    receive, via the first transceiver, the odometer report from the driver's mobile device in response to the odometer input request, wherein the odometer report includes a vehicle displayed odometer reading;
    determining whether the vehicle displayed odometer reading corresponds to the odometer reading included in the vehicle performance data; and
    associating the driver ID with the vehicle ID in the HOS database in response to determining the vehicle displayed odometer reading corresponds to the odometer reading included in the vehicle performance data.

25. A system, comprising:
    a host server,
        means for receiving the vehicle performance data from a vehicle recording device onboard the vehicle, wherein the vehicle recording device does not perform HOS calculations;
        means for receiving an indication of a driver status change from a driver's mobile device, wherein the driver's mobile device does not perform HOS calculations, and wherein the driver's mobile device and the vehicle recording device independently exchange information with the host server without requiring communication between the driver's mobile device and the vehicle recording device; and
        means for updating a vehicle fleet management database based at least in part on the received vehicle performance data and the received indication of the driver status change.

26. The system of claim 25, wherein the host server further comprises means for providing the vehicle performance data to the driver's mobile device without exchanging data with the vehicle recording device.

27. The system of claim 26, wherein the vehicle fleet management database is one or more of a type database, an hours-of-service database, a workflow database, a proof-of-delivery database, and a driver feedback database.

28. A system, comprising:
a host server, comprising:
a first transceiver configured to communicate with a communication network; and
a host server processor coupled to the first transceiver, wherein the host server is remote from the vehicle, and wherein the host server processor is configured with processor-executable instructions to perform operations comprising:
receiving, via the first transceiver, the vehicle performance data from a second transceiver coupled to a vehicle recording device onboard the vehicle, wherein the vehicle recording device does not perform HOS calculations;
receiving, via the first transceiver, an indication of a driver status change from a third transceiver coupled to a driver's mobile device, wherein the driver's mobile device does not perform HOS calculations, and wherein the driver's mobile device and the vehicle recording device independently exchange information with the host server without requiring communication between the driver's mobile device and the vehicle recording device; and
updating a vehicle fleet management database based at least in part on the received vehicle performance data and the received indication of the driver status change.

29. The system of claim 28, wherein the host server processor is configured with processor-executable instructions to perform operations further comprising providing the vehicle performance data to the driver's mobile device via the first transceiver without exchanging data with the vehicle recording device.

30. The system of claim 29, wherein the vehicle fleet management database is one or more of a type database, an hours-of-service database, a workflow database, a proof-of-delivery database, and a driver feedback database.

* * * * *